US009860732B2

(12) United States Patent
Xiong et al.

(10) Patent No.: US 9,860,732 B2
(45) Date of Patent: Jan. 2, 2018

(54) USER EQUIPMENT AND METHOD FOR PACKET BASED DEVICE-TO-DEVICE (D2D) DISCOVERY IN AN LTE NETWORK

(71) Applicant: Intel IP Corporation, Santa Clara, CA (US)

(72) Inventors: Gang Xiong, Beaverton, OR (US); Huaning Niu, Milpitas, CA (US); Debdeep Chatterjee, Mountain View, CA (US); Alexey Khoryaev, Nizhny Novgorod (RU); Jong-Kae Fwu, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 20 days.

(21) Appl. No.: 15/096,504

(22) Filed: Apr. 12, 2016

(65) Prior Publication Data

US 2016/0337835 A1 Nov. 17, 2016

Related U.S. Application Data (63) Continuation of application No. 14/280,799, filed on May 19, 2014, now Pat. No. 9,326,122.

(Continued)

(51) Int. Cl.
*H04W 8/00* (2009.01)
*H04W 48/12* (2009.01)
(Continued)

(52) U.S. Cl.
CPC ........... *H04W 8/005* (2013.01); *H04W 4/005* (2013.01); *H04W 4/008* (2013.01); *H04W 48/12* (2013.01);
(Continued)

(58) Field of Classification Search
CPC ......... H04W 72/0413; H04W 72/0446; H04W 8/005; H04W 48/16; H04W 48/12;
(Continued)

(56) References Cited

U.S. PATENT DOCUMENTS

| 5,754,638 A | 5/1998 | Kusunoki |
| 6,788,702 B1 | 9/2004 | Garcia-luna-aceves et al. |

(Continued)

FOREIGN PATENT DOCUMENTS

| CN | 101632319 A | 1/2010 |
| CN | 102014441 A | 4/2011 |

(Continued)

OTHER PUBLICATIONS

"U.S. Appl. No. 14/300,937, Notice of Allowance dated Jul. 15, 2016", 10 pgs.

(Continued)

*Primary Examiner* — Khawar Iqbal
(74) *Attorney, Agent, or Firm* — Schwegman Lundberg & Woessner, P.A.

(57) ABSTRACT

Embodiments of a User Equipment (UE) and methods for packet based device-to-device (D2D) discovery in an LTE network are generally described herein. In some embodiments, UE may be enabled for proximity services and may be configured to receive signaling from an enhanced node B (eNB) indicating resources allocated for D2D discovery. The UE may configure a discovery packet in accordance with a predetermined configuration to have at least a discovery payload and a cyclic-redundancy check (CRC). The discovery payload may include discovery-related content. The UE may be configured to transmit the discovery packet on at least some of the indicated resources for receipt by a receiving UE. In some embodiments, a demodulation refer- (Continued)

ence signal (DMRS) may be selected to indicate a payload size and/or MCS of the discovery packet's payload.

17 Claims, 3 Drawing Sheets

Related U.S. Application Data (60) Provisional application No. 61/863,902, filed on Aug. 8, 2013, provisional application No. 61/909,938, filed on Nov. 27, 2013.

(51) Int. Cl.
| | | |
|---|---|---|
| *H04W 72/04* | (2009.01) | |
| *H04W 72/08* | (2009.01) | |
| *H04W 4/00* | (2009.01) | |
| *H04W 72/02* | (2009.01) | |
| *H04W 76/02* | (2009.01) | |
| *H04W 76/04* | (2009.01) | |
| *H04W 48/16* | (2009.01) | |
| *H04W 4/02* | (2009.01) | |

(52) U.S. Cl.
CPC ............ *H04W 48/16* (2013.01); *H04W 72/02* (2013.01); *H04W 72/08* (2013.01); *H04W 76/023* (2013.01); *H04W 76/046* (2013.01); *H04W 4/023* (2013.01)

(58) Field of Classification Search
CPC ... H04W 76/023; H04W 4/008; H04W 72/02; H04W 72/08; H04W 4/023
USPC ......................................................... 455/434
See application file for complete search history.

(56) References Cited

U.S. PATENT DOCUMENTS

| | | | |
|---|---|---|---|
| 7,474,686 B2 | 1/2009 | Ho | |
| 8,265,065 B2 | 9/2012 | Xu | |
| 8,903,419 B2 | 12/2014 | Yu et al. | |
| 9,042,938 B2 | 5/2015 | Nimbalker | |
| 9,100,160 B2 | 8/2015 | Martinez Tarradell et al. | |
| 9,154,267 B2 | 10/2015 | He et al. | |
| 9,326,122 B2 | 4/2016 | Xiong et al. | |
| 9,363,739 B2 | 6/2016 | Yu et al. | |
| 9,450,667 B2 | 9/2016 | Lin et al. | |
| 9,479,918 B2 | 10/2016 | Yu et al. | |
| 9,499,995 B2 | 11/2016 | Xiong et al. | |
| 9,504,088 B2 | 11/2016 | Xiong et al. | |
| 9,554,406 B2 | 1/2017 | Lin et al. | |
| 9,559,761 B2 | 1/2017 | Luft et al. | |
| 9,560,513 B2 | 1/2017 | Lu et al. | |
| 9,560,574 B2 | 1/2017 | Chatterjee et al. | |
| 9,564,958 B2 | 2/2017 | Martinez Tarradell et al. | |
| 9,640,053 B2 | 5/2017 | Siann et al. | |
| 9,681,354 B2 | 6/2017 | Bangolae et al. | |
| 9,788,186 B2 | 10/2017 | Chatterjee et al. | |
| 9,801,207 B2 | 10/2017 | Sergeyev et al. | |
| 2002/0045428 A1 | 4/2002 | Chesson | |
| 2004/0264425 A1 | 12/2004 | Nishikawa | |
| 2006/0045083 A1 | 3/2006 | Hasty, Jr. et al. | |
| 2006/0293061 A1 | 12/2006 | Kobayashi et al. | |
| 2007/0019578 A1 | 1/2007 | Meiri | |
| 2007/0160046 A1 | 7/2007 | Matta | |
| 2007/0165593 A1 | 7/2007 | Hundal et al. | |
| 2007/0297523 A1 | 12/2007 | Cattaneo et al. | |
| 2008/0019343 A1 | 1/2008 | Benveniste | |
| 2008/0063106 A1 | 3/2008 | Hahm et al. | |
| 2008/0119130 A1 | 5/2008 | Sinha | |
| 2008/0123591 A1 | 5/2008 | Jung et al. | |
| 2008/0232798 A1 | 9/2008 | Kasezawa | |
| 2008/0267162 A1 | 10/2008 | Benveniste | |
| 2009/0016232 A1 | 1/2009 | Kwon et al. |
| 2009/0122736 A1 | 5/2009 | Damnjanovic et al. |
| 2009/0221284 A1 | 9/2009 | Kim et al. |
| 2009/0264142 A1 | 10/2009 | Sankar et al. |
| 2009/0305693 A1 | 12/2009 | Shimomura et al. |
| 2009/0327395 A1 | 12/2009 | Park et al. |
| 2010/0008334 A1 | 1/2010 | Doi et al. |
| 2010/0009675 A1 | 1/2010 | Wijting et al. |
| 2010/0009690 A1 | 1/2010 | Jin et al. |
| 2010/0260169 A1 | 10/2010 | Gheorghiu et al. |
| 2011/0028102 A1 | 2/2011 | Li et al. |
| 2011/0080873 A1 | 4/2011 | Zhang et al. |
| 2011/0134746 A1 | 6/2011 | Liu et al. |
| 2011/0199905 A1 | 8/2011 | Pinheiro et al. |
| 2011/0250892 A1 | 10/2011 | Gupta et al. |
| 2011/0250913 A1 | 10/2011 | Vajapeyam et al. |
| 2011/0268006 A1 | 11/2011 | Koskela et al. |
| 2011/0268101 A1 | 11/2011 | Wang et al. |
| 2011/0274040 A1 | 11/2011 | Pani et al. |
| 2011/0276816 A1 | 11/2011 | Cooper et al. |
| 2011/0299485 A1 | 12/2011 | Hannu et al. |
| 2012/0023355 A1 | 1/2012 | Song et al. |
| 2012/0033613 A1 | 2/2012 | Lin et al. |
| 2012/0039321 A1 | 2/2012 | Ghosh et al. |
| 2012/0057476 A1 | 3/2012 | Chan et al. |
| 2012/0064902 A1 | 3/2012 | Kronander et al. |
| 2012/0069823 A1 | 3/2012 | Low et al. |
| 2012/0077510 A1 | 3/2012 | Chen et al. |
| 2012/0087247 A1 | 4/2012 | Min et al. |
| 2012/0093098 A1 | 4/2012 | Charbit et al. |
| 2012/0106370 A1 | 5/2012 | Radulescu et al. |
| 2012/0106456 A1 | 5/2012 | Jin et al. |
| 2012/0106517 A1 | 5/2012 | Charbit et al. |
| 2012/0113934 A1 | 5/2012 | Ko et al. |
| 2012/0115518 A1 | 5/2012 | Zeira et al. |
| 2012/0155351 A1 | 6/2012 | Lee et al. |
| 2012/0163181 A1 | 6/2012 | Xue et al. |
| 2012/0163235 A1 | 6/2012 | Ho et al. |
| 2012/0163311 A1 | 6/2012 | Park |
| 2012/0184306 A1 | 7/2012 | Zou et al. |
| 2012/0207073 A1 | 8/2012 | Kim et al. |
| 2012/0213109 A1 | 8/2012 | Xu et al. |
| 2012/0243431 A1 | 9/2012 | Chen et al. |
| 2012/0249372 A1 | 10/2012 | Jovicic et al. |
| 2012/0252442 A1 | 10/2012 | Fu et al. |
| 2012/0270584 A1 | 10/2012 | Liang et al. |
| 2012/0275365 A1 | 11/2012 | Anderson et al. |
| 2012/0275366 A1 | 11/2012 | Anderson et al. |
| 2012/0294165 A1 | 11/2012 | Turtinen et al. |
| 2012/0307748 A1 | 12/2012 | Cheng et al. |
| 2012/0309419 A1 | 12/2012 | Lee et al. |
| 2013/0017779 A1 | 1/2013 | Song et al. |
| 2013/0028235 A1 | 1/2013 | Barrett |
| 2013/0044623 A1 | 2/2013 | Speight et al. |
| 2013/0058306 A1 | 3/2013 | Noh et al. |
| 2013/0064187 A1 | 3/2013 | Patil et al. |
| 2013/0066966 A1 | 3/2013 | Patil et al. |
| 2013/0077594 A1 | 3/2013 | Park et al. |
| 2013/0080597 A1 | 3/2013 | Liao |
| 2013/0083779 A1 | 4/2013 | Ahn et al. |
| 2013/0107727 A1 | 5/2013 | Lunden et al. |
| 2013/0109301 A1 | 5/2013 | Hakola et al. |
| 2013/0114472 A1 | 5/2013 | Tamaki et al. |
| 2013/0160101 A1 | 6/2013 | Hakola et al. |
| 2013/0170347 A1 | 7/2013 | Zhang et al. |
| 2013/0188546 A1 | 7/2013 | Turtinen et al. |
| 2013/0194941 A1 | 8/2013 | Lu et al. |
| 2013/0194991 A1 | 8/2013 | Vannithamby et al. |
| 2013/0195026 A1 | 8/2013 | Johnsson et al. |
| 2013/0223356 A1 | 8/2013 | Khoshnevis et al. |
| 2013/0230035 A1 | 9/2013 | Grandhi et al. |
| 2013/0242866 A1 | 9/2013 | Lin et al. |
| 2013/0260811 A1 | 10/2013 | Rayavarapu |
| 2013/0288608 A1 | 10/2013 | Fwu et al. |
| 2013/0294399 A1 | 11/2013 | Lee |
| 2013/0301492 A1 | 11/2013 | Ji et al. |
| 2013/0301499 A1 | 11/2013 | Jain et al. |
| 2013/0301570 A1 | 11/2013 | Xu et al. |
| 2013/0310100 A1 | 11/2013 | Lee et al. |

(56) References Cited

U.S. PATENT DOCUMENTS

| | | | |
|---|---|---|---|
| 2013/0322276 A1 | 12/2013 | Pelletier et al. |
| 2013/0329711 A1 | 12/2013 | Seo et al. |
| 2013/0331137 A1 | 12/2013 | Burchill et al. |
| 2013/0336229 A1 | 12/2013 | Kakadia et al. |
| 2014/0003262 A1 | 1/2014 | He et al. |
| 2014/0003348 A1 | 1/2014 | Velev et al. |
| 2014/0010179 A1 | 1/2014 | Lee |
| 2014/0016614 A1 | 1/2014 | Velev et al. |
| 2014/0031054 A1 | 1/2014 | Zou et al. |
| 2014/0036795 A1 | 2/2014 | Martinez Tarradell et al. |
| 2014/0036876 A1 | 2/2014 | Li et al. |
| 2014/0044000 A1 | 2/2014 | Charbit et al. |
| 2014/0056220 A1* | 2/2014 | Poitau ............... H04W 40/246 370/328 |
| 2014/0066018 A1 | 3/2014 | Zhu |
| 2014/0066058 A1 | 3/2014 | Yu et al. |
| 2014/0079016 A1 | 3/2014 | Dai et al. |
| 2014/0082185 A1 | 3/2014 | Abraham et al. |
| 2014/0084543 A1 | 3/2014 | Snow et al. |
| 2014/0094183 A1 | 4/2014 | Gao et al. |
| 2014/0185529 A1 | 7/2014 | Lim et al. |
| 2014/0187249 A1 | 7/2014 | Fu et al. |
| 2014/0187283 A1 | 7/2014 | Nimbalker et al. |
| 2014/0213186 A1 | 7/2014 | Gage et al. |
| 2014/0213259 A1 | 7/2014 | Teyeb et al. |
| 2014/0219095 A1* | 8/2014 | Lim .................. H04W 72/085 370/235 |
| 2014/0241260 A1 | 8/2014 | Schmidt et al. |
| 2014/0248917 A1 | 9/2014 | Scipione et al. |
| 2014/0269494 A1 | 9/2014 | Zhu et al. |
| 2014/0269558 A1 | 9/2014 | Sartori et al. |
| 2014/0328329 A1* | 11/2014 | Novlan .............. H04W 72/042 370/336 |
| 2014/0334380 A1 | 11/2014 | Pinheiro et al. |
| 2014/0335867 A1 | 11/2014 | Hsu et al. |
| 2014/0370904 A1 | 12/2014 | Smith et al. |
| 2014/0378157 A1 | 12/2014 | Wei et al. |
| 2015/0009883 A1 | 1/2015 | Bai et al. |
| 2015/0016312 A1 | 1/2015 | Li et al. |
| 2015/0031359 A1 | 1/2015 | Yu et al. |
| 2015/0036519 A1 | 2/2015 | Kazmi et al. |
| 2015/0043403 A1 | 2/2015 | Martinez Tarradell et al. |
| 2015/0043445 A1 | 2/2015 | Xiong et al. |
| 2015/0043448 A1 | 2/2015 | Chatterjee et al. |
| 2015/0043449 A1 | 2/2015 | Bangolae et al. |
| 2015/0043541 A1 | 2/2015 | Blankenship et al. |
| 2015/0043687 A1 | 2/2015 | Luo et al. |
| 2015/0045016 A1 | 2/2015 | Xiong et al. |
| 2015/0055588 A1 | 2/2015 | Yerramalli et al. |
| 2015/0056931 A1 | 2/2015 | Yerramalli et al. |
| 2015/0063148 A1 | 3/2015 | Sadek |
| 2015/0094057 A1 | 4/2015 | Lu et al. |
| 2015/0105067 A1 | 4/2015 | Valliappan et al. |
| 2015/0110012 A1 | 4/2015 | Bhushan et al. |
| 2015/0118968 A1 | 4/2015 | Nory et al. |
| 2015/0126196 A1 | 5/2015 | Lu et al. |
| 2015/0139175 A1 | 5/2015 | Ratasuk et al. |
| 2015/0146585 A1 | 5/2015 | Rashid et al. |
| 2015/0146645 A1 | 5/2015 | Sergeyev et al. |
| 2015/0156764 A1 | 6/2015 | Yang et al. |
| 2015/0163705 A1 | 6/2015 | Lu et al. |
| 2015/0172870 A1 | 6/2015 | Venkatesan et al. |
| 2015/0195831 A1 | 7/2015 | Du et al. |
| 2015/0195844 A1 | 7/2015 | Yang |
| 2015/0208225 A1 | 7/2015 | Yu et al. |
| 2015/0222562 A1* | 8/2015 | Ashokan .............. H04L 47/27 370/412 |
| 2015/0223084 A1 | 8/2015 | Lightstone et al. |
| 2015/0230284 A1 | 8/2015 | Nimbalker et al. |
| 2015/0257094 A1 | 9/2015 | Wei et al. |
| 2015/0264677 A1 | 9/2015 | He et al. |
| 2015/0271657 A1* | 9/2015 | Xiong .................. H04W 8/005 370/329 |
| 2015/0271763 A1 | 9/2015 | Balachandran et al. |
| 2015/0319731 A1 | 11/2015 | Cui et al. |
| 2015/0319745 A1 | 11/2015 | Seo et al. |
| 2015/0326356 A1 | 11/2015 | Guan et al. |
| 2015/0327201 A1 | 11/2015 | He et al. |
| 2015/0334635 A1 | 11/2015 | Caretti et al. |
| 2015/0334693 A1 | 11/2015 | Lu et al. |
| 2015/0341911 A1 | 11/2015 | Wakabayashi et al. |
| 2015/0341914 A1 | 11/2015 | Lee et al. |
| 2015/0341918 A1 | 11/2015 | Yang et al. |
| 2015/0351059 A1 | 12/2015 | Seo |
| 2015/0351084 A1* | 12/2015 | Werb .................... H04W 12/08 370/329 |
| 2015/0358067 A1 | 12/2015 | Zhang et al. |
| 2016/0014589 A1 | 1/2016 | Niu et al. |
| 2016/0135200 A1 | 5/2016 | Brahmi et al. |
| 2016/0142898 A1* | 5/2016 | Poitau ............... H04W 72/0413 370/329 |
| 2016/0143077 A1 | 5/2016 | Fodor et al. |
| 2016/0150391 A1 | 5/2016 | Lee et al. |
| 2016/0234670 A1 | 8/2016 | Zhang et al. |
| 2016/0249283 A1 | 8/2016 | Yu et al. |
| 2016/0249344 A1 | 8/2016 | Schlienz et al. |
| 2016/0262184 A1 | 9/2016 | Wentink |
| 2016/0269185 A1 | 9/2016 | Stojanovski et al. |
| 2016/0270120 A1 | 9/2016 | Kronander et al. |
| 2016/0302251 A1 | 10/2016 | Chatterjee et al. |
| 2016/0315821 A1* | 10/2016 | Page .................. H04L 67/12 |
| 2016/0360554 A1 | 12/2016 | Ko et al. |
| 2017/0006632 A1 | 1/2017 | Elliott et al. |
| 2017/0105127 A1 | 4/2017 | Xiong et al. |
| 2017/0245213 A1 | 8/2017 | Martinez Tarradell et al. |

FOREIGN PATENT DOCUMENTS

| | | |
|---|---|---|
| CN | 102754518 A | 10/2012 |
| CN | 102859925 A | 1/2013 |
| CN | 103229585 A | 7/2013 |
| CN | 103582006 A | 2/2014 |
| CN | 104396313 A1 | 3/2015 |
| CN | 105359059 A | 2/2016 |
| CN | 105359476 A | 2/2016 |
| CN | 105359606 A | 2/2016 |
| CN | 105359615 A | 2/2016 |
| CN | 105379316 A | 3/2016 |
| CN | 105659660 A | 6/2016 |
| CN | 106060769 A | 10/2016 |
| CN | 106162533 A | 11/2016 |
| CN | 106912109 A | 6/2017 |
| EP | 2509345 A1 | 10/2012 |
| EP | 2579672 A1 | 4/2013 |
| HK | 1221109 A1 | 5/2017 |
| HK | 1221110 A1 | 5/2017 |
| HK | 1221525 A1 | 6/2017 |
| HK | 1221564 A1 | 6/2017 |
| HK | 1222282 A | 6/2017 |
| JP | 2007053628 A | 3/2007 |
| JP | 2010519793 A | 6/2010 |
| JP | 2011039498 A | 2/2011 |
| JP | 2012010202 A | 1/2012 |
| JP | 2012507974 A | 3/2012 |
| JP | 2012507975 A | 3/2012 |
| JP | 2012514435 A | 6/2012 |
| JP | 2012178642 A | 9/2012 |
| JP | 2012191353 A | 10/2012 |
| JP | 2013529416 A | 7/2013 |
| JP | 2014504814 A | 2/2014 |
| JP | 2014530521 A | 11/2014 |
| JP | 2014533448 A | 12/2014 |
| JP | 2015515241 A | 5/2015 |
| JP | 2016509799 A | 3/2016 |
| JP | 2016527848 A | 9/2016 |
| JP | 6130069 B2 | 4/2017 |
| KR | 1020090087098 A | 8/2009 |
| KR | 1020090106603 A | 10/2009 |
| KR | 1020110000479 A | 1/2011 |
| KR | 1020110068768 A | 6/2011 |
| KR | 1020110081100 A | 7/2011 |
| KR | 1020110093642 A | 8/2011 |
| KR | 1020120031546 A | 4/2012 |

(56) References Cited

FOREIGN PATENT DOCUMENTS

| | | | |
|---|---|---|---|
| KR | 1020120039605 A | 4/2012 | |
| KR | 1020120070444 A | 6/2012 | |
| KR | 1020120071676 A | 7/2012 | |
| KR | 1020120137496 A | 12/2012 | |
| KR | 1020130006673 A | 1/2013 | |
| KR | 1020130035964 A | 4/2013 | |
| KR | 1020160021188 A | 2/2016 | |
| KR | 101741590 B1 | 5/2017 | |
| TW | 201246859 A | 11/2012 | |
| TW | 201410054 A | 3/2014 | |
| TW | 201521505 A | 6/2015 | |
| TW | I552641 B | 10/2016 | |
| TW | 201705810 A | 2/2017 | |
| WO | WO-2011083997 A2 | 7/2011 | |
| WO | WO-2011099821 A2 | 8/2011 | |
| WO | WO-2011100570 A1 | 8/2011 | |
| WO | WO-2011100596 A2 | 8/2011 | |
| WO | WO-2011112051 A2 | 9/2011 | |
| WO | WO-2011119680 A2 | 9/2011 | |
| WO | WO-2012023280 A1 | 2/2012 | |
| WO | WO-2012056209 A1 | 5/2012 | |
| WO | WO-2012068731 A1 | 5/2012 | |
| WO | WO-2012088470 A1 | 6/2012 | |
| WO | WO-2012136311 A1 | 10/2012 | |
| WO | WO-2012177002 A2 | 12/2012 | |
| WO | WO-2013012759 A1 | 1/2013 | |
| WO | WO-2013013409 A1 | 1/2013 | |
| WO | WO-2013025057 A2 | 2/2013 | |
| WO | WO-2013036823 A1 | 3/2013 | |
| WO | WO-2013040231 A1 | 3/2013 | |
| WO | WO-2013048193 A1 | 4/2013 | |
| WO | WO-2013087835 A1 | 6/2013 | |
| WO | WO-2013169789 A1 | 11/2013 | |
| WO | WO-2014021987 A1 | 2/2014 | |
| WO | WO-2014022776 A1 | 2/2014 | |
| WO | WO-2014022797 A1 | 2/2014 | |
| WO | WO-2014113537 A1 | 7/2014 | |
| WO | WO-2015021267 A1 | 2/2015 | |
| WO | WO-2015021276 A1 | 2/2015 | |
| WO | WO-2015021284 A1 | 2/2015 | |
| WO | WO 2015021315 A1 | 2/2015 | |
| WO | WO-2015021317 A1 | 2/2015 | |
| WO | WO-2015080796 A1 | 6/2015 | |

OTHER PUBLICATIONS

"U.S. Appl. No. 14/314,957, Examiner Interview Summary dated Jul. 19, 2016", 3 pgs.
"U.S. Appl. No. 14/314,957, Response filed Jul. 13, 2016 to Non Final Office Action dated May 12, 2016", 18 pgs.
"U.S. Appl. No. 14/318,006, Response filed Aug. 25, 2016 to Final Office Action dated Apr. 25, 2016", 12 pgs.
"U.S. Appl. No. 14/318,085, Final Office Action dated May 25, 2016", 15 pgs.
"U.S. Appl. No. 14/318,085, Response filed Aug. 25, 2016 to Final Office Action dated May 25, 2016", 11 pgs.
"U.S. Appl. No. 14/473,008, Final Office Action dated Jun. 3, 2016", 31 pgs.
"U.S. Appl. No. 14/473,008, Response filed Aug. 2, 2016 to Final Office Action dated Jun. 3, 2016", 13 pgs.
"U.S. Appl. No. 14/496,952, Examiner Interview Summary dated Aug. 23, 2016", 3 pgs.
"U.S. Appl. No. 14/496,952, Non Final Office Action dated Jun. 6, 2016", 13 pgs.
"U.S. Appl. No. 14/496,952, Response filed Aug. 29, 2016 to Non Final Office Action dated Jun. 6, 2016", 8 pgs.
"Chinese Application Serial No. 201480038461.6, Voluntary Amendment filed Jun. 17, 2016", w/ English Translation of Request form, 52 pgs.
"International Application Serial No. PCT/US2014/057619, International Preliminary Report on Patentability dated Jun. 9, 2016", 8 pgs.
"3rd Generation Partnership Project; Technical Specification Group Services and System Aspects; Machine-Type and other Mobile Data Applications Communications Enhancements (Release 12)", 3GPP TR 23.887 V0.8.0, 3rd Generation Partnership Project (3GPP), Mobile Competence Centre; 650, Route Des Lucioles; F-06921 Sophia-Antipolis Cedex; France, (Aug. 2, 2013), 1-153.
"U.S. Appl. No. 14/314,957, Final Office Action dated Feb. 23, 2017", 31 pgs.
"U.S. Appl. No. 14/314,957, Notice of Allowance dated May 19, 2017", 10 pgs.
"U.S. Appl. No. 14/314,957, Response filed Mar. 21, 2017 to Non Final Office Action dated Feb. 23, 2017", 18 pgs.
"U.S. Appl. No. 14/318,008, Corrected Notice of Allowance dated May 18, 2017", 2 pgs.
"U.S. Appl. No. 14/318,008, Notice of Allowance dated Jan. 27, 2017", 5 pgs.
"U.S. Appl. No. 14/318,008, Notice of Allowance dated Sep. 16, 2016", 13 pgs.
"U.S. Appl. No. 14/318,085, Notice of Allowability dated Jan. 4, 2017", 2 pgs.
"U.S. Appl. No. 14/318,085, Notice of Allowability dated Nov. 25, 2016", 2 pgs.
"U.S. Appl. No. 14/318,085, Notice of Allowance dated Sep. 23, 2016", 12 pgs.
"U.S. Appl. No. 14/473,008, Advisory Action dated Sep. 15, 2016", 5 pgs.
"U.S. Appl. No. 14/473,008, Examiner Interview Summary dated Sep. 16, 2016", 3 pgs.
"U.S. Appl. No. 14/473,008, Non Final Office Action dated Dec. 23, 2016", 35 pgs.
"U.S. Appl. No. 14/473,008, Response filed Mar. 3, 2017 to Non Final Office Action dated Dec. 23, 2016", 17 pgs.
"U.S. Appl. No. 14/473,008, Response filed Oct. 3, 2016 to Advisory Action dated Sep. 15, 2016", 15 pgs.
"U.S. Appl. No. 14/496,952, Advisory Action dated Mar. 2, 2017", 3 pgs.
"U.S. Appl. No. 14/496,952, Final Office Action dated Nov. 17, 2016", 14 pgs.
"U.S. Appl. No. 14/496,952, Response filed Feb. 17, 2017 to Final Office Action dated Nov. 17, 2016", 9 pgs.
"U.S. Appl. No. 14/496,952, Response filed May 16, 2017 to Final Office Action dated Nov. 17, 2016", 9 pgs.
"U.S. Appl. No. 15/186,779, Non Final Office Action dated Mar. 10, 2017", 20 pgs.
"U.S. Appl. No. 15/357,032, Non Final Office Action dated Mar. 14, 2017", 15 pgs.
"U.S. Appl. No. 15/357,032, Preliminary Amendment filed Dec. 29, 2016", 8 pgs.
"U.S. Appl. No. 15/424,429, Preliminary Amendment filed May 12, 2017", 9 pgs.
"Considerations for power saving state", Alcatel-Lucent Shanghai Bell, Alcatel-Lucent, 3GPP TSG-SA WG2#98 S2-133036, [Online] Retrieved from the Internet : <URL:http://www.3gpp.org/ftp/tsg_sa/WG2_Arch/TSGS2_98_Valencia/Docs/S2-133036.zip>, (Jul. 19, 2013).
"D2D discovery", R1-132317 D2D Discovery, 3rd Generation Partnership Project (3GPP), Retrieved from the Internet: <URL:http://www.3gpp.org/ftp/tsg_ran/WGI_RL1/TSGRI_73/Docs>, (May 11, 2013), 5 pgs.
"D2D Discovery Design for Public Safety and General Scenarios[online]", Intel Corporation,3GPP TSG-RAN WG1 ?74 R1-132941, [Online] Retrieved from the Internet : <URL:http://www.3gpp.org/ftp/tsg_ran/WG1_RL1/TSGR1_74/Docs/R1-132941.zip>, (Aug. 10, 2013), 7 pgs.
"D2D Discovery Terminology Way Forward", Qualcomm Inc., Huawei, HiSilicon, LG Electronics, LG Uplus, Intel, Samsung, NEC, RIM, ETRI. 3GPP TSG RAN WG1 #73 R1132772, [Online] Retrieved from the Internet :<URL:http://www.3gpp.org/ftp/tsg_ran/WG1_RL1/TSGR1_73/Docs/R1-132772.zip>, (May 28, 2013), 4 pgs.
"Direct Discovery for LTE Based D2D [online]", Ericsson, ST-Ericsson, 3GPP TSG-RAN WG1#73 R1-132031, [Online]

(56) References Cited

OTHER PUBLICATIONS

Retrieved from the Internet : <http://www.3gpp.org/ftp/tsg_ran/WG1_RL1/TSGR1_73/Docs/R1-132031.zip>, (May 11, 2013), 7 pgs.

"Discussion on MTC idle states for power saving", Alcatel-Lucent Shang Bell, Alcatel-lucent, 3GPP TSG-RAN WG2#82 R2-132031, [Online] Retrieved from the Internet : <URL:http://www.3gpp.org/ftp/tsg_ran/WG2_RL2/TSGR2_82/Docs/R2-132031.zip>, (May 11, 2013).

"Discussion on PRACH Coverage Enhancement for Low Cost MTC", Intel Corporation: 3GPP Draft; R1-132930—Discussion on PRACH Coverage Enhancement for Low Cost MTC, 3rd Generation Partnership Project (3GPP), Mobile Competence Centre ; 650, Route Deslucioles ; F-06921 Sophia-Antipo vol. RAN WG1, no. Barcelona, Spain, (Aug. 10, 2013), 7 pgs.

"European Application Serial No. 14833927.8, Extended European Search Report dated May 10, 2017", 11 pgs.

"European Application Serial No. 14834152.2, Extended European Search Report dated Feb. 14, 2017", 7 pgs.

"European Application Serial No. 14834706.5, Extended European Search Report dated Feb. 2, 2017", 10 pgs.

"European Application Serial No. 14835021.8, Extended European Search Report dated Mar. 7, 2017", 13 pgs.

"European Application Serial No. 14835105.9, Extended European Search Report dated Feb. 23, 2017", 10 pgs.

"European Application Serial No. 16192991.4, Extended European Search Report dated Jan. 3, 2017", (Jan. 3, 2017), 10 pgs.

"European Application Serial No. 17165440.3, Extended European Search Report dated May 15, 2017", 10 pgs.

"Further evaluation and way forward of selected UEPCOP solutions", Intel Corporation,3GPP TSG-RAN WG2?83 R2-132794, <URL:http://www.3gpp.org/ftp/tsg_ran/WG2_RL2/TGR2_83/Docs/R2-132794.zip>, (Aug. 10, 2013).

"Japanese Application Serial No. 2016-525843, Office Action dated Dec. 20, 2016", (W/ English Translation), 15 pgs.

"Japanese Application Serial No. 2016-525843, Response Filed Mar. 17, 2017 to Office Action dated Dec. 20, 2016", (W/ English Claims), 18 pgs.

"Japanese Application Serial No. 2016-525844, Office Action dated Dec. 20, 2016", W/ English Translation, 8 pgs.

"Japanese Application Serial No. 2016-525844, Response Filed Mar. 15, 2017 to Office Action dated Dec. 20, 2016", (W/ English Claims), 8 pgs.

"Japanese Application Serial No. 2016-533442, Office Action dated Jan. 24, 2017", with English Translation, 9 pgs.

"Japanese Application Serial No. 2016-533442, Response Filed Apr. 24, 2017 to Office Action dated Jan. 24, 2017", (W/ English Claims), 22 pgs.

"Korean Application Serial No. 10-2016-7000316, Office Action dated Sep. 6, 2016", W/ English Translation, 9 pgs.

"Korean Application Serial No. 10-2016-7000316, Response filed Nov. 4, 2016 to Office Action dated Sep. 6, 2016", W/ English Translation of Claims, 27 pgs.

"Korean Application Serial No. 2016-7000399, Office Action dated Oct. 20, 2016", W/ English Translation, 9 pgs.

"Korean Application Serial No. 2016-7000399, Response filed Dec. 19, 2016 to Office Action dated Oct. 20, 2016", (English Translation of Claims), 32 pgs.

"Korean Application Serial No. 2016-7000580, Office Action dated May 1, 2017", With English Translation, 10 pgs.

"Korean Application Serial No. 2016-7020017, Office Action dated May 1, 2017", With English Translation, 10 pgs.

"LTE D2D Reference System Design and Evaluation Methodology", 3GPP TSG RAN WG1 Meeting #72bis, R1-130953, 3GPP ftp server, (Apr. 6, 2013), 8 pgs.

"ProSe UE discovery design aspects[online]", Renesas Mobile Europe Ltd,3GPP TSG-RAN WG1 Meeting #73 R1-132173, [Online] Retrieved from the Internet : <URL:http://www.3gpp.org/ftp/tsg_ran/WG1_RL1/TSGR1_73/Docs/R1-132173.zip>, (May 11, 2013), 4 pgs.

"Study on Enhancements to Machine-Type Communications (MTC) and other Mobile Data Applications", Technical Specification Group Radio Access Network; 3GPP TSG-RAN WG2#82 R2-132251, [Online] Retrieved from the Internet : <URL:http://www.3gpp.org/ftp/tsg_ran/WG2_RL2/TSGR2_82/Docs/R2-132251.zip>, (Jun. 2, 2013), 251.

"TR 23.887: Machine-Type and other Mobile Data Applications Communications Enhancements (Release 12) for information (MTCe)", SA WG2, 3GPP TSG-SA#60 SP-130234, [Online] Retrieved from the Internet : <URL:http://www.3gpp.org/ftp/tsg_sa/TSG_SA/TSGS_60/Docs/SP-130234.zip>, (Jun. 11, 2013), 93-115.

Huawei, et al., "Power Saving State for Devices", 3GPP Draft; S2-124184, 3rd Generation Partnership Project (3GPP), Mobile Competence Centre ; 650, Route Deslucioles ; F-06921 Sophia-Antipolis Cedex; France vol. SA WG2, [Online] Retrieved from the Internet : <http://www.3gpp.org/ftp/tsg sa/WG2 Areh/TSGS2_93_Sofia/Docs/>, (Oct. 12, 2012).

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, (Dec. 2012), 340 pgs.

"U.S. Appl. No. 13/718,334, Corrected Notice of Allowance dated Apr. 8, 2016", 8 pgs.

"U.S. Appl. No. 13/718,334, Advisory Action dated Mar. 23, 2015", 3 pgs.

"U.S. Appl. No. 13/718,334, Examiner Interview Summary dated Jan. 15, 2016", 3 pgs.

"U.S. Appl. No. 13/718,334, Final Office Action dated Dec. 3, 2014", 16 pgs.

"U.S. Appl. No. 13/718,334, Non Final Office Action dated Jul. 14, 2014", 16 pgs.

"U.S. Appl. No. 13/718,334, Non Final Office Action dated Aug. 21, 2015", 18 pgs.

"U.S. Appl. No. 13/718,334, Notice of Allowance dated Mar. 28, 2016", 12 pgs.

"U.S. Appl. No. 13/718,334, Response filed Jan. 21, 2016 to Non Final Office Action dated Aug. 21, 2015", 19 pgs.

"U.S. Appl. No. 13/718,334, Response filed Mar. 3, 2015 to Final Office Action dated Dec. 3, 2014", 18 pgs.

"U.S. Appl. No. 13/718,334, Response filed Oct. 10, 2014 to Non Final Office Action dated Jul. 14, 2014", 22 pgs.

"U.S. Appl. No. 13/790,630, Final Office Action dated Feb. 3, 2015", 16 pgs.

"U.S. Appl. No. 13/790,630, Non Final Office Action dated Sep. 5, 2014", 17 pgs.

"U.S. Appl. No. 13/790,630, Notice of Allowance dated Mar. 31, 2015", 7 pgs.

"U.S. Appl. No. 13/790,630, Response filed Jan. 5, 2015 to Non Final Office Action dated Sep. 5, 2014", 9 pgs.

"U.S. Appl. No. 13/790,630, Response filed Mar. 17, 2015 to Final Office Action dated Feb. 3, 2015", 10 pgs.

"U.S. Appl. No. 14/124,984, Preliminary Amendment filed Dec. 9, 2013", 11 pgs.

"U.S. Appl. No. 14/126,983, Preliminary Amendment filed Dec. 17, 2013", 8 pgs.

"U.S. Appl. No. 14/280,799, Non Final Office Action dated Jul. 13, 2015", 34 pgs.

"U.S. Appl. No. 14/280,799, Notice of Allowance dated Dec. 24, 2015", 8 pgs.

"U.S. Appl. No. 14/280,799, Response filed Aug. 27, 2015 to Non Final Office Action dated Jul. 13, 2015", 11 pgs.

"U.S. Appl. No. 14/300,937, Final Office Action dated Mar. 25, 2016", 11 pgs.

"U.S. Appl. No. 14/300,937, Non Final Office Action dated Sep. 25, 2015", 12 pgs.

"U.S. Appl. No. 14/300,937, Response filed Dec. 22, 2015 to Non Final Office Action dated Sep. 25, 2015", 13 pgs.

"U.S. Appl. No. 14/318,008, Non Final Office Action dated Oct. 8, 2015", 16 pgs.

"U.S. Appl. No. 14/318,008, Response filed Feb. 8, 2016 to Non Final Office Action dated Oct. 8, 2015", 13 pgs.

(56) References Cited

OTHER PUBLICATIONS

"U.S. Appl. No. 14/318,085, Non Final Office Action dated Oct. 8, 2015", 14 pgs.
"U.S. Appl. No. 14/318,085, Response filed Mar. 7, 2016 to Non Final Office Action dated Oct. 8, 2015", 13 pgs.
"U.S. Appl. No. 14/473,008, Non Final Office Action dated Nov. 23, 2015", 28 pgs.
"U.S. Appl. No. 14/473,008, Preliminary Amendment filed Oct. 28, 2014", 17 pgs.
"U.S. Appl. No. 14/473,008, Response filed Feb. 23, 2016 to Non Final Office Action dated Nov. 23, 2015", 11 pgs.
"Australian Application Serial No. 2013259726, First Examiner Report dated Apr. 14, 2015", 4 pgs.
"Australian Application Serial No. 2013259726, Response filed Feb. 18, 2016 to First Examiner Report dated Apr. 14, 2015", 9 pgs.
"Australian Application Serial No. 2013259726, Response filed Mar. 31, 2016 to Subsequent Examiners Report dated Mar. 29, 2016", 6 pgs.
"Australian Application Serial No. 2013259726, Subsequent Examiners Report dated Mar. 29, 2016", 2 pgs.
"Canadian Application Serial No. 2,871,087, Office Action dated Feb. 24, 2016", 4 pgs.
"Discussion of D2D discovery methods", R1-132068, 3GPP TSG RAN WG1 Meeting #73, (May 2013), 1-5.
"Discussion on design options for D2D discovery", R1-131924, 3GPP TSG RAN WG1 Meeting #73, (May 2013), 1-6.
"European Application Serial No. 13786929.3, Extended European Search Report dated Nov. 17, 2015", 12 pgs.
"Evolved Universal Terrestrial Radio Access (E-UTRA) and Evolved Universal Terrestrial Radio Access Network (E-UTRAN)", 3GPP TS 36.300 v11.6.0 Technical Specification Group Radio Access Network. Release 11, (Jun. 2013), 209 pgs.
"Evolved Universal Terrestrial Radio Access (E-UTRA) and Evolved Universal Terrestrial Radio Access Network (E-UTRAN); Overall description; Stage 2", 3GPP TS 36.300 version 0.8.0 Release 10., (Jul. 2012), 210 pgs.
"Evolved Universal Terrestrial Radio Access (E-UTRA); Physical Channels and Modulation", 3GPP TS 36.211 v11.0.0 Technical Specification Group Radio Access Network, Release 11, (Sep. 2012), 106 pgs.
"Evolved Universal Terrestrial Radio Access (E-UTRA); Physical layer procedures", 3GPP TS 36.213 v11.0.0 Technical Specification Group Radio Access Network, Release 11, (Sep. 2012), 143 pgs.
"Evolved Universal Terrestrial Radio Access (E-UTRA); Radio Resource Control (RRC)", 3GPP TS 36.331 V11.4.0 (Jun. 2013) Technical Specification Group Radio Access Network; Protocol specification (Release 11), (Jun. 2013), 346 pgs.
"Evolved Universal Terrestrial Radio Access (E-UTRA); Radio Resource Control (RRC); Protocol specification", 3GPP TS 36.331 version 10.6.0 Release 10., (Jul. 2012), 306 pgs.
"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.
"Evolved Universal Terrestrial Radio Access (E-UTRA); Requirements for support of radio resource management", 3GPP TS 36.133 version 10.7.0 Release 10. ETSI TS 136 133. LTE., (Jul. 2012), 661 pgs.
"Evolved Universal Terrestrial Radio Access (E-UTRA); User Equipment (UE) procedures in idle mode", 3GPP TS 36.304 version 10.6.0 Release 10. ETSI TS 136 304, LTE., (Jul. 2012), 35 pgs.
"Evolved Universal Terrestrial Radio Access (E-UTRA); User Equipment (UE) radio access capabilities", 3GPP TS 36.306 v11.3.0 Technical Specification Group Radio Access Network, Release 11, (Mar. 2013), 27 pgs.
"Evolved Universal Terrestrial Radio Access (E-UTRS) User Equipment (UE) procedures in idle mode", 3GPP TS 36.304 v11.4.0 Technical Specification Group Radio Access Network, Release 11, (Jun. 2013), 34 pgs.
"Evolved Universal Terrestrial Radio Access (E_UTRA); Multiplexing and channel coding", 3GPP TS 36.212 v11.0.0, Technical Specification Group Radio Access Network, Release 11, (Sep. 2012), 79 pgs.
"Evolved Universal Terrestrial Radio Access Network (E-UTRAN); S1 Application Protocol (S1AP)", 3GPP TS 36.413 v11.4.0 Technical Specification Group Radio Access Network, Release 11, (Jun. 2013), 274 pgs.
"General Packet Radio Service (GPRS) enhancements for Evolved Universal Terrestrial Radio Access Network (E-UTRAN) access", 3GPP TS 23.401 V12.1.0. Technical Specification Group Services and System Aspects. Release 12., (Jun. 2013), 28-32.
"International Application Serial No. PCT/US2013/039963, International Preliminary Report on Patentability dated Nov. 20, 2014", 8 pgs.
"International Application Serial No. PCT/US2013/039963, International Search Report dated Jun. 12, 2013", 5 pgs.
"International Application Serial No. PCT/US2013/039963, Written Opinion dated Jun. 12, 2013", 6 pgs.
"International Application Serial No. PCT/US2013/044445, International Search Report dated Sep. 16, 2013", 3 pgs.
"International Application Serial No. PCT/US2013/044445, Written Opinion dated Sep. 16, 2013", 9 pgs.
"International Application Serial No. PCT/US2013/053428, International Search Report dated Dec. 19, 2013", 4 pgs.
"International Application Serial No. PCT/US2013/053428, Written Opinion dated Dec. 19, 2013", 8 pgs.
"International Application Serial No. PCT/US2013/053470, International Search Report dated Nov. 21, 2013", 3 pgs.
"international Application Serial No. PCT/US2013/053470, Written Opinion dated Nov. 21, 2013", 4 pgs.
"International Application Serial No. PCT/US2014/050128, International Preliminary Report on Patentability dated Feb. 18, 2016", 9 pgs.
"International Application Serial No. PCT/US2014/050128, International Search Report dated Nov. 13, 2014", 8 pgs.
"International Application Serial No. PCT/US2014/050128, Invitation to Correct Defects dated Aug. 14, 2014", 4 pgs.
"International Application Serial No. PCT/US2014/050128, Written Opinion dated Nov. 13, 2014", 7 pgs.
"International Application Serial No. PCT/US2014/050147, International Preliminary Report on Patentability dated Feb. 18, 2016", 8 pgs.
"International Application Serial No. PCT/US2014/050147, International Search Report dated Nov. 13, 2014", 3 pgs.
"International Application Serial No. PCT/US2014/050147, Written Opinion dated Nov. 13, 2014", 6 pgs.
"International Application Serial No. PCT/US2014/050159, International Preliminary Report on Patentability dated Feb. 18, 2016", 9 pgs.
"International Application Serial No. PCT/US2014/050159, International Search Report dated Nov. 18, 2014", 3 pgs.
"International Application Serial No. PCT/US2014/050159, Written Opinion dated Nov. 18, 2014", 7 pgs.
"International Application Serial No. PCT/US2014/050207, International Preliminary Report on Patentability dated Feb. 18, 2016", 8 pgs.
"International Application Serial No. PCT/US2014/050207, International Search Report dated Nov. 19, 2014", 3 pgs.
"International Application Serial No. PCT/US2014/050207, Written Opinion dated Nov. 19, 2014", 6 pgs.
"International Application Serial No. PCT/US2014/050209, International Search Report dated Nov. 27, 2014", 3 pgs.
"International Application Serial No. PCT/US2014/050209, Written Opinion dated Nov. 27, 2014", 8 pgs.
"International Application Serial No. PCT/US2014/057619, International Search Report dated Dec. 26, 2014", 3 pgs.
"International Application Serial No. PCT/US2014/057619, Written Opinion dated Dec. 26, 2014", 6 pgs.
"International Application Serial No. T/US2014/050209, International Preliminary Report on Patentability dated Feb. 19, 2016", 10 pgs.

(56) References Cited

OTHER PUBLICATIONS

"Japanese Application Serial No. 2015-509219, Notice of Reasons for Rejection dated Mar. 22, 2016", (English Translation), 3 pgs.
"Japanese Application Serial No. 2015-509219, Office Action dated Sep. 15, 2015", W/ English Translation, 6 pgs.
"Japanese Application Serial No. 2015-509219, Response filed Dec. 15, 2015 to Office Action dated Sep. 15, 2015", w/ English Translation of Claims, 18 pgs.
"Korean Application Serial No. 2014-7031575, Office Action dated Aug. 17, 2015", W/ English Translation, 12 pgs.
"Korean Application Serial No. 2014-7031575, Reasons for Rejection dated Feb. 22, 2016", (English Translation), 11 pgs.
"Korean Application Serial No. 2014-7031575, Response filed Oct. 19, 2015 to Office Action dated Aug. 17, 2015", W/ English Claims, 36 pgs.
"Long Term Evolution (LTE): A Technical Overview", Technical White Paper., (Jun. 19, 2007), 15 pgs.
"Long Term Evolution Protocol Overview", White Paper., [Online]. Retrieved from the Internet: <URL: http://www.freescale.com/files/wireless_comm/doc/whitepaper/LTEPTCLOVWWP.pdf>, (Oct. 2008), 21 pgs.
"Machine-Type and other Mobil Data Applications Communications Enhancements", 3GPP TSG SA WG2 Meeting #92, TD S2-123002; 3GPP TR 23.887 v0.1.0, Release 12, (May 2012), 16 pgs.
"Machine-Type and other Mobile Data Applications Communications Enhancemetns", 3GPP TR 23.887 v1.1.0 Technical Specification Group Services and System Aspects (Release 12), (Sep. 2013), 153 pgs.
"Mobile radio interface Layer 3 specification; Core network protocols; Stage 3", 3GPP TS 24.008 V12.2.0. Technical Specification Group Core Network and Terminals. Release 12., (Jun. 2013), 682 pgs
"Non-Access Stratum (NAS) configuration Management Object (MO)", 3GPP TS 24.368 V11.2.0. Technical Specification Group Core Network and Terminals. Release 11., (Sep. 2012), 13 pgs.
"Non-Access-Stratum (NAS) protocol for Evolved Packet System (EPS); Stage 3", 3GPP TS 24.301 V12.1.0. Technical Specification Group Core Network and Terminals. Release 12., (Jun. 2013), 350 pgs.
"ProSe direct communication (D2D)", R1-132174, 3GPP TSG-RAN WG1 Meeting #73, Renesas Mobile Europe Ltd, (May 2013), 1-4.
"Service requirements for Machine-Type Communications (MTC); Stage 1", 3GPP TS 22.368 version 10.5.0 Release 10. ETSI TS 122 368. Digital cellular telecommunications system (Phase 2+). Universal Mobile Telecommunications System (UMTS). LTE., (Jul. 2011), 18 pgs.
"Study on LTE Device to Device Proximity Services", 3GPP TSG Ran Meeting#58, RP-122009, Qualcomm Incorporated, [Online]. Retrieved from the Internet: <URL: http://www.3gpp.org/ftp/tsg_ran/TSG_RAN/TSGR_58/Docs/RP-122009.zip>, (2012), 6 pgs.
"Study on provision of low-Cost MTC UEs based on LTE", 3GPP TR 36.888 v2.1.1 Technical Specification Group Radio Access Network, Release 12, (Jun. 2013), 55 pgs.
"T5 based downlink small data transfer without establising RRC security", CATT; 3GPP Draft: S2-122826 T5 based Downlink Small Data Transfer Without Establishing RRC Security, 3rd Generation Partnership Project (3GPP), Mobile Competence Centre; 650, Route Des Lucioles: F-06921 Sophia-Antipolis Cedex; France deel SA Wg2, nr. Barcelona, Spain,, (Jul. 13, 2012), 3 pgs.
"Taiwanese Application Serial No. 103125302, Office Action dated Sep. 23, 2015", W/ English Translation, 7 pgs.
"Taiwanese Application Serial No. 103125302, Response filed Dec. 17, 2015 to Office Action dated Sep. 23, 2015", w/ English Claims, 20 pgs.
"Technical Specification Group Radio Access Network; Evolved Universal Terrestrial Radio Access Network (E-UTRAN); S1 Application Protocol (S1AP)", 3GPP TS 36.413 V11.2.1 (Release 11), (Feb. 2013), 272 pgs.
"Techniques for D2D Discovery", R1-132503, 3GPP TSG RAN WG1 Meeting #73, (May 2013), 1-7.
"Transfer and update of solution of small data transfer in NAS signalling", Vodafone, [RIM ?]; 3GPP Draft; S2-123414 Rev 3112 Small Data by NAS, 3rd Generation Partnership Project (3GPP), Mobile Competence Centre; 650, Route Des Lucioles; F-06921 Sophia-Antipolis Cedex; France, (Jul. 2012), 7 pgs.
"Use of generic NAS transport for small data", ZTE, Intel, Interdigital; 3GPP Draft; s2-123416, 3rd Generation Partnership Project (3GPP), Mobile Competence Centre; 650, Route Des Lucioles; F-06921 Sophia-Antipolis Cedex; deel SA Wg2, nr. Barcelona, Spain, (Jul. 2012), 7 pgs.
"WirelessMoves: Thoughts on the evolution of wireless networks and mobile web 2.0", [Online]. Retrieved from the Internet: <URL: http://mobilesociety.typepad.com/mobile_life/2009/02/sae-review-part-2-mobility-and-connection-management.html>, (Feb. 4, 2009), 3 pgs.
Alcatel-Lucent, et al., "PRACH coverage extension for MTC devices", R1-130939, 3GPP TSG-RAN WG1 Meeting #72bis, Chicago, USA, [Online]. Retrieved from the Internet: <URL: http://www.3gpp.org/ftp/tsg_ran/wgl_r11/TSGRL_72b/Docs/>, (Apr. 15-19, 2013), 3 pgs.
Alcatel-Lucent, Shanghai Bell, et al., "Discussi on on MTC Idle states", 3GPP TSG-WG #69-bis R2-102033, [Online]. Retrieved from the Internet: <http://www.3gpp.org/ftp/tsg_ran/WG2_RL2/TSGR2_69bis/Docs/R2-102033.zip>, (Apr. 1, 2010).
Andreev, S., et al., "Efficient small data access for machine-type communications in LTE", 2013 IEEE International Conference on Communications (ICC), (2013), 3569-3574.
Cho, Bong Youl (Brian), "LTE RRC/RRM", TTA LTE/MIMO Standards/Technology Training. Nokia Siemens Networks., (May 2012), 30 pgs.
Ericson, Juniper, et al., "Device triggering procedure", 3GPP TSG-CT WG3 Meeting #69. C3-120956., [Online] retrieved from the internet<http://v9ww.3gpp.org/ftp/tsg_ct/WG3_interworking_ex-CN3/TSGC3_69JKyoto/Docs/>, (May 21, 2012), 4 pgs.
Ericsson, et al., "D2D for LTE Proximity Services: Overview", 3GPP TSG-RAN WG1 #73, R1-132028, (May 2013), 6 pgs.
Nokia, "DRX parameters in LTE", 3GPP Draft; R2-071285 DRX Paramet ERS in E-UTRAN, 3rd Generation Partnership Project (3GPP), Mobile Competence Centre 650, Route Des Lucioles ; F-06921 Sophia-Antipolis Cedex ; France, vol. RAN WG2, no. St. Julian, (Mar. 2007).
Nokia, "Mobility Management in LTE_Idle state", 3GPP Draft; S2-060633 Idle, 3rd Generation Partnership Project (3GPP), Mobile Competence Centre ; 650, Route Des Lucioles ; F-06921 Sophia-Antipolis Cedex ; France, vol. SA WG2, no, (Feb. 7, 2006).
Nokia Siemens Networks, et al., "UE power saving and fast dormancy in LTE network", 3GPP Draft; R2-104783 (Battery Saving), 3rd Generation Partnership Project (3GPP), Mobile Competence Centre ; 650, Route Des Lucioles , F-06921 Sophia-Antipolis Cedex ; France, vol. RAN WG2, no. Madrid, Spain, (Aug. 16, 2010).
"U.S. Appl. No. 14/314,957, Non Final Office Action dated May 12, 2016", 32 pgs.
"U.S. Appl. No. 14/318,008, Final Office Action dated Apr. 25, 2016", 16 pgs.
"U.S. Appl. No. 15/022,534, Preliminary Amendment filed on Mar. 16, 2016", 8 pgs.
"U.S. Appl. No. 14/473,008, Notice of Allowance dated Jun. 20, 2017", 9 pgs.
"U.S. Appl. No. 14/496,952, Non Final Office Action dated Jun. 20, 2017", 12 pgs.
"U.S. Appl. No. 15/022,534, Non Final Office Action dated Jun. 26, 2017", 19 pgs.
"U.S. Appl. No. 15/186,779, Response filed Jul. 10, 2017 to Non Final Office Action dated Mar. 10, 2017", 13 pgs.
"U.S. Appl. No. 15/357,032, Response Filed Jun. 8, 2017 to Non Final Office Action dated Mar. 14, 2017", 10 pgs.
"U.S. Appl. No. 15/424,429, Supplemental Preliminary Amendment filed Jun. 15, 2017", 9 pgs.
"Chinese Application Serial No. 201480038449.5, Office Action dated May 16, 2017", W/English Claims, 16 pgs.

(56) References Cited

OTHER PUBLICATIONS

"European Application Serial No. 14834152.2, Response Filed Jul. 4, 2017 to Extended European Search Report dated Feb. 14, 2017", 18 pgs.

"European Application Serial No. 14866388.3, Extended European Search Report dated Jul. 6, 2017", 10 pgs.

"Korean Application Serial No. 10-2017-7013997, Voluntary Amendment Filed on Jun. 15, 2017", (W/ English Claims), 12 pgs.

"Korean Application Serial No. 2016-7000580, Response Filed Jun. 30, 2017 to Office Action dated May 1, 2017", (W/ English Claims), 38 pgs.

"Korean Application Serial No. 2016-7020017, Response Filed Jun. 29, 2017 to Office Action dated May 5, 2017", (W/ English Claims), 24 pgs.

"On Resource Allocation and System Operation for D2D Discovery", 3GPP TSG RAN WG1 Meeting #74bis R1-134141 Intel, (Oct. 2013), 10 pgs.

"Taiwanese Application Serial No. 105121010, Office Action dated May 24, 2017", W/ English Translation, 16 pgs.

"U.S. Appl. No. 14/314,957, Corrected Notice of Allowance dated Aug. 30, 2017", 2 pgs.

"U.S. Appl. No. 14/314,957, Corrected Notice of Allowance dated Sep. 15, 2017", 2 pgs.

"U.S. Appl. No. 14/496,952, Response filed Sep. 20, 2017 to Non Final Office Action dated Jun. 20, 2017", 11 pgs.

"U.S. Appl. No. 15/022,534, Resonse filed Sep. 26, 2017 to Non Final Office Action dated Jun. 26, 2017", 11 pgs.

"U.S. Appl. No. 15/186,779, Final Office Action dated Sep. 21, 2017", 24 pgs.

"U.S. Appl. No. 15/357,032, Notice of Allowance dated Sep. 15, 2017", 5 pgs.

"Chinese Application Serial No. 201480038449.5, Response Filed Sep. 28, 2017 to Office Action dated May 16, 2017", (W/ English Claims), 14 pgs.

"European Application Serial No. 14834706.5, Response Filed Aug. 21, 2017 to Extended European Search Report dated Feb. 2, 2017", 23 pgs.

"European Application Serial No. 14835021.8, Response Filed Sep. 26, 2017 to Extended European Search Report dated Mar. 7, 2017", 46 pgs.

"European Application Serial No. 16192991.4, Response Filed Aug. 21, 2017 to Extended European Search Report dated Jan. 3, 2017", 16 pgs.

"Japanese Application Serial No. 2016-133179, Office Action dated Aug. 8, 2017", With English Translation, 6 pgs.

"Japanese Application Serial No. 2016-164318, Office Action dated Sep. 5, 2017", With English Translation, 22 pgs.

"Korean Application Serial No. 10-2017-7013997, Notice of Preliminary Rejection dated Aug. 23, 2017", W/English Translation, 12 pgs.

"Korean Application Serial No. 10-2017-7013997, Response Filed Oct. 23, 2017 to Notice of Preliminary Rejection dated Aug. 23, 2017", (W/ English Claims), 24 pgs.

"Link-level Analysis of LTE-based D2D Discovery Design", Intel Corporation, 3GPP TSG RAN WG1 Meeting #74, R1-132943, (Aug. 2013), 6 pgs.

"Scrambling Sequences for Enhanced PDCCH", Apple Inc, 3GPP TSG, RAN WG1 Meeting #68 R1-120272, [Online] retrieved from the internet: <URL:http://www.3gpp.org/ftp/tsg_ran/WG1_RL1/TSGR1_68/Docs/R1-120272,.zip>, (Feb. 1, 2012), 7 pgs.

"Taiwanese Application Serial No. 105121010, Response Filed Aug. 15, 2017 to Office Action dated May 24, 2017", (W/ English Claims), 14 pgs.

* cited by examiner

USER EQUIPMENT AND METHOD FOR PACKET BASED DEVICE-TO-DEVICE (D2D) DISCOVERY IN AN LTE NETWORK

PRIORITY CLAIMS

This application is a continuation of U.S. patent application Ser. No. 14/280,799, now issued as U.S. Pat. No. 9,326,122, which claims the benefit of priority under 35 U.S.C. 119(e) to U.S. Provisional Patent Application Ser. No. 61/863,902, filed Aug. 8, 2013, and to U.S. Provisional Patent Application Ser. No. 61/909,938, filed Nov. 27, 2013, each of which is incorporated herein by reference in its entirety.

TECHNICAL FIELD

Embodiments pertain to wireless communications. Some embodiments relate to cellular networks such as 3GPP LTE (Long Term Evolution) networks. Some embodiments relate to direct device-to-device (D2D) communication. Some embodiments relate to D2D discovery in LTE networks. Some embodiments relate to user equipment (UE) enabled for proximity services (ProSe enabled UEs).

BACKGROUND

Support for direct D2D communication as an integrated part of a wireless communication network is currently being considered for the further evolution of LTE networks. With direct D2D communication, user equipment (UE) may communicate directly with each other without involvement of a base station or an enhanced node B (eNB). One issue with D2D communication is device discovery to enable D2D communications. Device discovery involves discovering one or more other discoverable UEs within communication range for D2D communication. Device discovery also involves being discovered by one or more other discovering UEs within communication range for D2D communications. There are many unresolved issues with respect to device discovery for D2D communication including the signaling used for device discovery and the discovery information conveyed during device discovery.

Thus there are general needs for UEs and methods for improved device discovery for D2D communication in LTE networks. There are also general needs for UEs and methods for signaling and conveying discovery information for D2D discovery.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
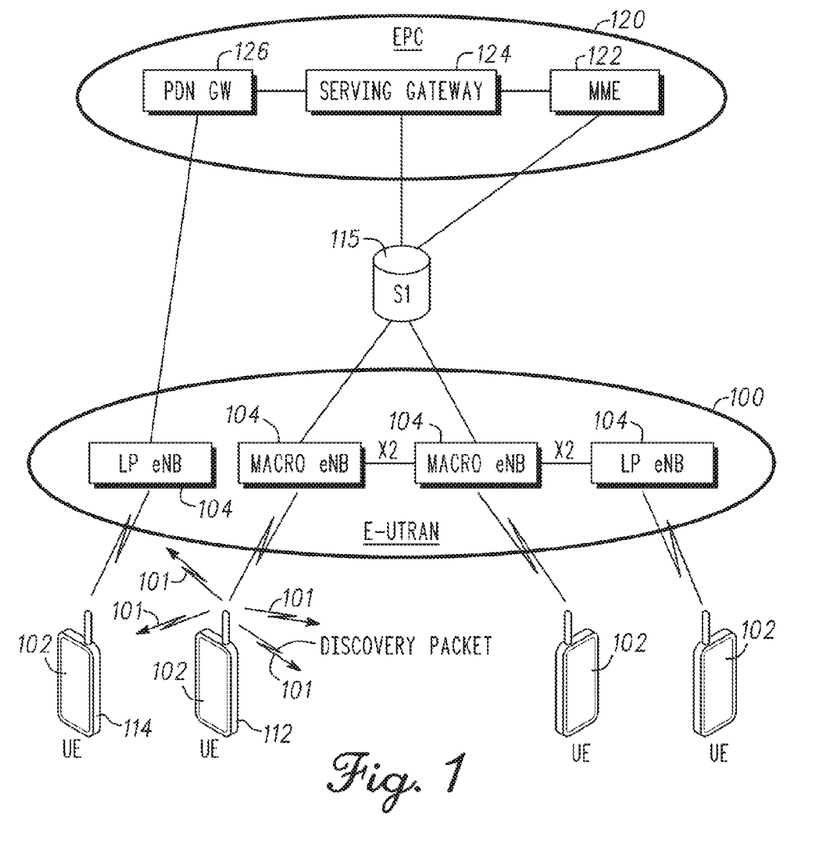
FIG. 1 shows a portion of an end-to-end network architecture of an LTE network in accordance with some embodiments.

FIG. 1 shows a portion of an end-to-end network architecture of an LTE network with various network components in accordance with some embodiments. The network architecture comprises a radio access network (RAN) (e.g., as depicted, the E-UTRAN or evolved universal terrestrial radio access network) 100 and a core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124 and packet data network gateway (PDN GW) 126. The RAN also includes enhanced node Bs (eNBs) 104 (which may operate as base stations) for communicating with user equipment (UE) 102. The eNBs 104 may include macro eNBs and low power (LP) eNBs.

In accordance with some embodiments, the UEs 102 may be arranged for device-to-device (D2D) communications including D2D discovery of other UEs for direct D2D communication. Some embodiments provide a physical layer design for packet-based D2D discovery. In some embodiments, a UE, such as UE 112, may configure and transmit a discovery packet 101 (e.g., rather than a discovery sequence) to realize D2D discovery. This allows additional discovery-related content to be shared directly between the UEs. In these embodiments, the UE 112 that transmits the discovery packet 101 may be referred to as a discovering device since it is discovering another UE (e.g., UE 114). These embodiments are discussed in more detail below.

The MME is similar in function to the control plane of legacy Serving GPRS Support Nodes (SGSN). The MME manages mobility aspects in access such as gateway selection and tracking area list management. The serving GW 124 terminates the interface toward the RAN 100 and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN and may be a key node for policy enforcement and charging data collection. It may also provide an anchor point for mobility with non-LTE accesses. The external PDN may be any kind of IP network as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well or to add network capacity in areas with very dense phone usage, such as train stations. As used herein, the term LP eNB refers to any suitable relatively lower power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically thirty to fifty meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.) or more recently in-aircraft. A picocell eNB can generally connect through the X2 link to another eNB such as a macro eNB through its base station controller (BSC) functionality. A LP eNB may be implemented with a picocell eNB since it may be coupled to a macro eNB via an X2 interface. Picocell eNBs or other LP eNBs may incorporate some or all functionality of a macro eNB. In some cases, this may be referred to as an access point, base station or enterprise femtocell.

In some LTE embodiments, a physical downlink shared channel (PDSCH) carries user data and higher-layer signaling to a UE 102. The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs within a cell) is performed at the eNB 104 based on channel quality information fed back from the UEs 102 to the eNB 104, and then the downlink resource assignment information may be sent to a UE 102 on a physical downlink control channel (PDCCH) used for (and possibly assigned to) the UE 102.

The PDCCH uses CCEs (control channel elements) to convey the control information. Before being mapped to resource elements, the PDCCH complex-valued symbols may be first organized into quadruplets, which may be permuted using a sub-block inter-leaver for rate matching. Each PDCCH is transmitted using one or more of CCEs, where each CCE may correspond to nine sets of four physical resource elements known as resource element groups (REGs). Four QPSK symbols are mapped to each REG. The PDCCH may be transmitted using one or more CCEs, depending on the size of DCI and the channel condition. There may be four or more different PDCCH formats defined in LTE with different numbers of CCEs (e.g., aggregation level L=1, 2, 4, or 8).

Figure 2:
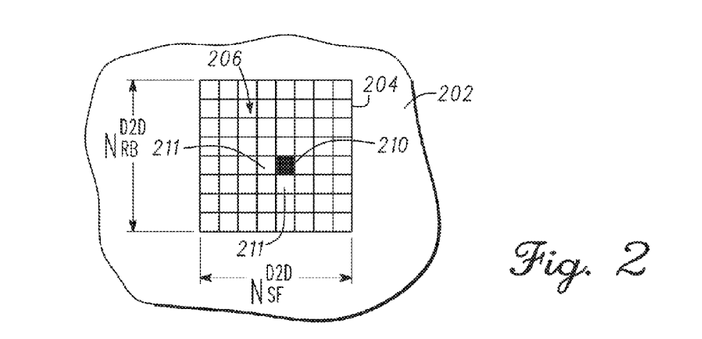
FIG. 2 shows a structure for a resource grid including a discovery zone for D2D communications in accordance with some embodiments.

FIG. 2 shows a structure for a resource grid including a discovery zone for D2D communications in accordance with some embodiments. The depicted grid is a time-frequency grid, called a resource grid, which is the physical resource in the downlink or uplink in each slot. The smallest time-frequency unit in a resource grid is denoted as a resource element (RE). The resource grid comprises a number of resource blocks (RBs) which describe the mapping of certain physical channels to resource elements. Each resource block comprises a collection of resource elements and in the frequency domain, represents the smallest quanta of resources that may be allocated, although the scope of the embodiments is not limited in this respect. There are several different physical channels that are conveyed using such resource blocks. The resource grid illustrated in FIG. 2 may comprise an LTE operation zone 202 which may comprise a plurality of physical RBs (PRBs) for use by the RAN 100.

In accordance with some embodiments, a UE 112 (FIG. 1) may receive signaling from an eNB 104 (FIG. 1) indicating a discovery zone 204 within the LTE operation zone 202. The discovery zone 204 may comprise a plurality of PRBs 206 of a discovery resource. The UE 112 may transmit a discovery packet 101 (FIG. 1) for receipt by one or more other UEs (e.g., UE 114 (FIG. 1)) for D2D discovery within some PRBs 206 of the discovery zone 204. In some embodiments, the resources allocated for D2D discovery may be resources of a physical-uplink shared channel (PUSCH), although the scope of the embodiments is not limited in this respect.

A PRB may be associated with a particular slot of a subframe in the time dimension and a particular group of frequency subcarriers in the frequency dimension. Each PRB, for example, may be identified by a RB index and a subframe index. In some embodiments, a discovery packet 101 may be transmitted within M subframes of N resources blocks where M and N are at least one and may be greater than one. These embodiments are described in more detail below.

In some embodiments, a PRB may comprise twelve sub-carriers in the frequency domain by 0.5 ms (i.e., one slot) in the time domain. The PRBs may be allocated in pairs (in the time domain), although this is not a requirement. In some embodiments, a PRB may comprise a plurality of REs. A RE may comprise one sub-carrier by one symbol. When a normal CP is used, a RB contains seven symbols. When an extended CP is used, the RB contains six symbols. A delay spread that exceeds the normal CP length indicates the use of extended CP. Each subframe may be one millisecond (ms) and one frame may comprise ten such subframes.

There are two different approaches in D2D discovery: restricted/closed D2D discovery and open D2D discovery. Restricted/closed D2D discovery may apply to use cases wherein a discoverable device may be discovered only by a select set of ProSe enabled discovering devices. A further implication of closed device discovery is consideration of scenarios wherein a discovering device tries to discover particular ProSe enabled device(s) (one or many from a set of ProSe enabled devices). Thus, for this use case, a discovering device would be assumed to know the ProSe enabled device it wishes to discover in its proximity.

Contrary to closed D2D discovery, open device discovery considers use cases wherein a discoverable device may want itself to be discovered by all ProSe enabled devices in its proximity. From the perspective of the discovering device, open device discovery implies that a discovering device may not be assumed to be aware of the identity of other ProSe enabled devices prior to discovery. Consequently, the device discovery mechanism for open discovery should aim towards discovering as many ProSe enabled devices in its proximity as possible.

For open D2D discovery, an eNB 104 may have a limited control on the discovery process among the UEs 102. In particular, an eNB 104 may periodically allocate certain discovery resources in the form of D2D discovery zones 204 for a UE 102 to transmit discovery information. As mentioned above, the discovery information may be in the form of a discovery packet with payload information. The examples described below are described with respect to a discovery packet with payload information. The discovery related information that UEs 102 may intend to share with each other may include a unique ID for device identification, a service identity, etc. (e.g., 48 bits or more) as the data payload, which may be protected by a cyclic-redundancy check (CRC). The number of resource blocks for discovery packet transmission in open D2D discovery design, which is denoted as $L_{RB}^{D2D}$, may be one or more, depending on the payload size and the overall discovery performance requirements.

In the examples illustrated below, the discovery zones may be periodic with each discovery zone comprising some RBs in the frequency domain and several subframes in time domain. In FIG. 2 $N_{RB}^{D2D}$, $n_{RB}^{start}$, $N_{SF}^{D2D}$ and $n_{SF}^{start}$ are denoted as the number of allocated RBs, the starting RB index and the number of subframes, the starting subframe index of each discovery zone, respectively. The information regarding the partitioning of the D2D discovery zones (such as discovery zone 204) may be semi-statically signaled by the eNB 104 using radio-resource control (RRC) signaling or by system information blocks (SIBs) for within network coverage scenarios. For a partial network coverage scenario, such information may be forwarded by an in-network coordinator UE to a UE that may be outside network coverage.

In some embodiments, for open D2D discovery, a UE 102 configured for D2D communication may randomly choose the subframe index and starting RB index within the discovery zone 204 to transmit a discovery packet 101. In some embodiments, the UE 102 may be configured for either open D2D discovery or closed D2D discovery. When configured for closed D2D discovery, an initial subframe within the discovery zone 204 may be assigned by the eNB 102 for transmission of the discovery packet 101. When configured for open D2D discovery, an initial subframe with the discovery zone 204 may be selected (e.g., randomly) by the UE 102 for transmission of the discovery packet 101. In some embodiments when configured for open D2D discovery the initial subframe with the discovery zone 204 may be randomly selected by the UE 102 for transmission of the discovery packet 101, although the scope of the embodiments is not limited in this respect.

For outside and partial network coverage scenarios, such information may be forwarded by the coordinator UE to the UEs that are outside network coverage. In these embodiments, for UEs that are outside the network coverage region, the configuration details for the D2D discovery zone may be either pre-configured or relayed by a UE within network coverage, or the configuration details may be configured by another UE outside network coverage. In some embodiments, a pool of resources constituting the discovery zone 204 may be associated with or configured by a synchronization source or any other coordinator UE. In these embodiments, a UE 102 may either be in a partial network coverage scenario if, for example, there is a presence of a network close by and it can communicate with and/or discover other UEs that are within network coverage, or fully outside network coverage.

For partial network coverage scenarios, discovery resources may be configured by an eNB 104 and may be relayed by another UE (e.g., a coordinator UE) that is within network coverage (and so, within operation zone of the network). For outside network coverage case, a specific spectrum may be allocated, although the scope of the embodiments is not limited in this respect. Once a UE determines that it is not under any network coverage or cannot detect synchronization signals that have originated from the network, the UE may search for synchronization signals on certain pre-configured spectrum band(s) for synchronization signals that may be transmitted by other UEs (i.e., not originating from an eNB 104), and for the latter case, the resources may be associated with the originating source of the synchronization signal or may be pre-configured.

As illustrated in FIG. 2, a discovery zone 204 may include one or more demodulation reference signal (DMRS) symbols 210. In some embodiments, resource elements 211 that are adjacent to DMRS symbols 210 may be used for D2D discovery. These embodiments are described in more detail below.

Figure 3A:
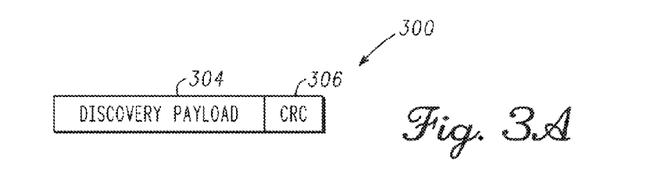
FIG. 3A illustrates a discovery packet in accordance with some embodiments.
Figure 3B:
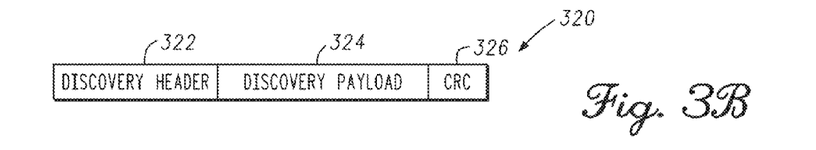
FIG. 3B illustrates a discovery packet in accordance with some alternate embodiments.

FIGS. 3A and 3B illustrate discovery packets in accordance with various embodiments. Discovery packet 300 (FIG. 3A) and discovery packet 320 (FIG. 3B) may be suitable for use as discovery packet 101 (FIG. 1). Discovery packet 300 includes a discovery payload 304 and a cyclic-redundancy check (CRC) 306. Discovery packet 320 includes a discovery header 322, a discovery payload 324 and a CRC 326. Discovery packet 300 does not include a header.

In accordance with embodiments, a UE, such as UE 112 (FIG. 1) enabled for proximity services (ProSe enabled) may be configured for packet-based D2D discovery operations in an LTE network, such as network 100 (FIG. 1). In these embodiments, the UE 112 may be configured to receive signaling from an eNB 104 (FIG. 1) indicating resources of a discovery zone 204 (FIG. 2) allocated for D2D discovery. A UE 112 may configure a discovery packet (i.e., discovery packet 300 (FIG. 3A) or discovery packet 320 (FIG. 3B)) in accordance with a predetermined configuration to have at least a discovery payload 304/324 and a CRC 306/326. The discovery payload 304/324 may include discovery-related content. The UE 112 may also be configured to transmit the discovery packet 101 on at least some of the indicated discovery resources (e.g., PRBs 206 of discovery zone 204) for receipt by a receiving UE 114. In these embodiments, a discovery packet, rather than a discovery sequence, is used to realize D2D discovery. This allows additional discovery-related content to be shared between UEs. In these embodiments, the UE 112 that transmits the discovery packet 101 may be referred to as a discovering device since it is discovering another UE (i.e., UE 114) and UE 114 may be referred to as a discoverable device.

In these embodiments, a discovery packet 300 may be configured without a header while in other embodiments, a discovery packet 320 may be configured with a header 322. In some embodiments, when the discovery packet 300 is configured without a header, a DMRS may be selected to indicate the payload size and/or the modulation and coding scheme (MCS) of the discovery payload 304. In some embodiments, when the discovery packet 320 is configured with a header 322, the discovery header 322 may indicate the payload size and/or MCS of the discovery payload 324. In some embodiments, when the discovery packet 300 is configured without a header, payload size and MCS of the discovery payload 304 may be predetermined. These embodiments, as well as other embodiments, are discussed in more detail below.

Referring to FIG. 3A, a UE 112 may configure and transmit the discovery packet 300 in accordance with the predetermined configuration (FIG. 3A) without a header. In some of these embodiments, the UE 112 may transmit an uplink DMRS. The DMRS may be selected to indicate the payload size and/or MCS of the discovery payload. In these embodiments, the payload size and MCS may be mapped to a particular DMRS. In these embodiments, the base sequence, the cyclic shift value and/or the orthogonal cover code of the DMRS may indicate one or more of the payload size and MCS of the discovery packet 300. In some of these embodiments, the base sequence, the cyclic shift value and/or the orthogonal cover code of the DMRS may indicate one or more payload size and MCS combinations.

In some embodiments, when the discovery packet 300 is configured and transmitted without a header, the discovery payload 304 may configurable to have one of a plurality of predetermined payload size and MCS combinations. Each of the predetermined payload size and MCS combinations may be mapped to one of a plurality of base sequences of the DMRS. The UE 112 may select a DMRS having one of the base sequences based on the payload size and MCS combination of the discovery packet 300. In some of these embodiments, the transmitting UE 112 may select a base sequence for the DMRS from a plurality of base sequences based on the payload size, the MCS or a combination of the payload size and the MCS of the discovery packet 300. The receiving UE 114 may perform a blind detection technique on the DMRS to search the plurality of base sequences to identify the particular base sequence to determined payload size and/or MCS of the discovery packet. In some of these embodiments, the MCS may be predetermined (i.e., fixed) and therefore only the payload size would be mapped to a particular one of the base sequences of the DMRS.

In some embodiments, when the discovery packet 300 is configured and transmitted without a header, the discovery payload 304 may be configurable to have one of a plurality of predetermined payload size and MCS combinations. Each of the predetermined payload size and MCS combinations may be mapped to one of a plurality of cyclic shifts (CS) values and/or an orthogonal cover codes (OCCs) of the DMRS. The UE 112 may select a DMRS (e.g., from a subset of DMRSs) to have a CS value and OCC based on the payload size and MCS combination of the discovery packet 300. In these embodiments, the receiving UE 114 may be able to determine the payload size and the MCS of the discovery packet 300 from the CS value and the OCC of the DMRS. In some of these embodiments, the base sequence of the DMRS would not provide any indication of the payload size and the MCS of the discovery packet, although the scope of the embodiments is not limited in this respect as the base sequence may also be used to indicate the payload size and/or the MCS. In these embodiments, the UE may select one DMRS from a subset of possible DMRSs for discovery packet transmission (e.g., with $n_{CS} \in \{0,4,8\}$ and $n_{oc} \in \{0,1\}$, where $n_{CS}$ is the cyclic shift index and $n_{oc}$ is the orthogonal cover code index). In these embodiments, for example, one subset of DMRS sequences with $n_{CS} \in \{0,4,8\}$ and $n_{oc} \in \{0\}$ may be used to indicate a discovery payload size of X bits while another subset of DMRS sequences with $n_{CS} \in \{0,4,8\}$ and $n_{oc} \in \{1\}$ may be used to indicate a discovery payload size of Y bits. Although these embodiments do not increase the number of blind detections for the case that the transmitting UE 112 randomly chooses a cyclic shift, these embodiments may effectively reduce the minimum distance between cyclic shifts if all transmitting UEs within radio range select the same payload size and MCS configuration.

In some embodiments, when the discovery packet 300 is configured and transmitted without a header, the discovery payload 304 may be configured to have a predetermined payload size, and to have a predetermined modulation and coding scheme (MCS). In some example embodiments, a predetermined payload size may be 192 bits, although the scope of the embodiments is not limited in this respect. In some example embodiments, a predetermined MCS the discovery payload 304 may be QPSK, although the scope of the embodiments is not limited in this respect. The use of a predetermined payload size and predetermined MCS allows the receiving UE 114 to receive and decode the discovery packet without additional processing (e.g., blind detection) to determine the payload size and MCS. In these embodiments, the receiving UE 114 may be configured to receive discovery packets 300 of a predetermined configuration within resources that are indicated for D2D discovery.

Referring to FIG. 3B, in some embodiments the UE 112 is arranged to configure and transmit the discovery packet 320 in accordance with the predetermined configuration 320 (FIG. 3B) with a discovery header 322. In these embodiments, the discovery header 322 may be configured to indicate one of a plurality of predetermined payload size and MCS combinations of the discovery payload 324. In these embodiments that include a discovery header 322, the discovery packet 320 may be considered a discovery frame. In these embodiments, the discovery header 322 may be limited to a predetermined number of bits (e.g., two bits) to indicate one of several predetermined payload size and MCS combinations. In some of these embodiments, the MCS of the discovery payload 324 may be predetermined (i.e., fixed) in which the discovery header 322 may only indicate the payload size.

In some of these embodiments in which the UE 112 is arranged to configure and transmit the discovery packet 320 with a discovery header 322, the discovery header 322 may be configured with a lower coding rate than the discovery payload 324. The discovery header 322 may have a predetermined (i.e., a deterministic) MCS. In these embodiments, the coding rate and modulation (i.e., the MCS) of the discovery header 322 may be predetermined and may be known to the receiving UE 114 allowing the receiving UE 114 to easily and quickly decode the discovery header 322. The use of a lower coding rate for the discovery header 322 may help to ensure more robust reception of the discovery header 322. In these embodiments, a repetition code or a lower coding rate of 1/2 may be used for the discovery header 322 while a greater coding rate of 2/3, 3/4, 5/6 or 7/8 may be used for the discovery payload 324 depending on the level of robustness desired. In these embodiments, QPSK modulation, for example, may be used for both the discovery header 322 and the discovery payload 324, although the scope of the embodiments is not limited in this respect.

In some embodiments, the coding rate of the discovery payload 304/324 (FIG. 3A/3B) may correspond to different levels of robustness. The UE 112 may select the coding for the discovery payload 304/324 based on a desired level of robustness. In these embodiments, the discovery packet may be configured without a header or with a header. In some embodiments, prior to configuring the discovery packet 300/320, the UE 112 may perform a proximity sensing process to identify the receiving UE 114 (as well as other ProSe enabled devices in its proximity). The UE 112 may select one of the levels of robustness based on a range (or proximity) to the receiving UE 114 and/or channel conditions. In these embodiments, lower coding rates (more coding bits) and smaller payload size combinations may be used from a longer range (greater robustness may be needed), while higher coding rates and larger payload size combinations may be used for a shorter range (less robustness may be needed). In these embodiments, the range to the receiving UE 114 may be based on received signal power from the receiving UE 114, although this is not a requirement as other range estimation and proximity detection techniques may be used. These embodiments may be employed with or without transmit power control (TPC).

In some of these embodiments in which the UE 112 is arranged to configure and transmit the discovery packet 320 with a discovery header 322, the discovery header 322 may be mapped to one or more REs 211 (FIG. 2) that are allocated for D2D discovery and that are adjacent to an uplink PUSCH DMRS symbol (e.g., DMRS symbol 210 (FIG. 2)) in order to take advantage of the best possible channel estimation since the DMRS may be used by UEs for channel estimation. In these embodiments, the discovery payload 324 may be mapped to REs allocated for D2D discovery other than REs used for the discovery header and REs used for the uplink PUSCH DMRS symbol. In these embodiments, the discovery header 322 may be transmitted in REs 211 adjacent to the DMRS symbol 210 while some of the remaining REs (i.e., REs of discovery zone 204 except REs used for discovery header and DMRS symbol) may be used for transmission of the discovery payload 324.

For example, if one resource block has one PRB pair (e.g., 14 OFDM symbols in the time domain and one PRB in the frequency domain), the DM-RS symbols may be located in 4th and $11^{th}$ OFDM symbols. The discovery header 322 may be mapped to some REs in the $3^{rd}$ and 12th OFDM symbols while the remaining REs may be used for discovery payload mapping. In these embodiments, the discovery header 322 and the discovery payload are multiplexed in the same discovery resource 324.

In some embodiments, the UE 112 may transmit the discovery packet 300/320 in accordance with a single-carrier frequency division multiple access (SC-FDMA) technique on discovery resources of a discovery zone 204, although this is not a requirements. In other alternate embodiments, the UE 112 may transmit the discovery packet 300/320 in accordance with an OFDMA technique.

In some embodiments, the UE 112 may append the discovery packet 300/320 with parity check bits when turbo coding is employed for channel coding. In these embodiments, turbo coding, such as the turbo coding technique specified in 3GPP TS36.212, may be reused for D2D discovery, although the scope of the embodiments is not limited in this respect.

In some embodiments, after adding the CRC 306/326 to a discovery packet 300/320, the UE 112 may encode the discovery packet 300/320 in accordance with a tail-biting convolutional coding (TBCC) technique when TBCC is used (i.e., instead of turbo coding). In these embodiments that employ TBCC, the discovery packet 300/320 may be appended with additional parity check bits. In these embodiments, the TBCC technique specified in 3GPP TS36.212 may be reused for D2D discovery, although the scope of the embodiments is not limited in this respect.

In some embodiments, after channel coding, the UE 112 may perform rate matching based on an amount of resources to be used for the D2D transmission of the discovery packet 300/320. During rate matching, coded bits (after channel coding) may be rate-matched to fill the amount of resources (e.g., PRBs) to be used for the D2D transmission of the discovery packet 300/320. In these embodiments, the rate matching and interleaver as specified in 3GPP TS36.212 may be reused for D2D discovery, although the scope of the embodiments is not limited in this respect. In accordance with some of these embodiments, one or more PRB pairs may be used for transmission of the discovery packet 300/320 depending on the payload size and performance requirements. In these embodiments, the rate matching may include generating a number of bits based on the number of PRBs allocated for transmission from a fixed-rate mother code. This may be realized by repeating or puncturing the bits of a mother codeword.

In some embodiments, after the rate matching, the UE 112 may perform bit scrambling on the coded bits in accordance with a scrambling sequence. A scrambling identity may be used to initialize the scrambling sequence. The scrambling identity may either be a cell identity (ID), a common scrambling identity, a function of the discovery resources used for transmission of the discovery packet 300/320, a function of the cyclic shift value and/or OCC index of the DMRS that is transmitted by the UE 112 or a common D2D scrambling identity or a combination of the these parameters. In these embodiments, the use of bit scrambling may help randomize interference and improve the ability of the receiving UE 114 to receive and decode the discovery packet 300/320.

In some embodiments, the signaling received from the eNB 104 may indicate that the discovery zone 204 is either semi-statically signaled using radio-resource control (RRC) signaling or may be provided in one or more system-information blocks (SIBs). The UE 112 may be configurable by the eNB 104 for either Type 1 D2D discovery or Type 2 D2D discovery. When configured for Type 1 D2D discovery, resources for transmission of the discovery packet 300/320 are allocated by the eNB 104 on a non-UE specific basis. When configured for Type 2 D2D discovery, specific resources for transmission of the discovery packet 300/320 are allocated by the eNB 104 to the UE 112. In some embodiments, for type 1 discovery (contention based D2D discovery or D2D discovery with UE-autonomous selection of discovery resources), a ProSe enabled device may randomly select the DMRS sequence when transmitting the discovery packet (e.g., when a discovery header is used or when the discovery payload size and MCS are predetermined).

In some embodiments, the discovery-related content included in the discovery payload 304/324 (FIG. 3A/3B) may include a unique ID for device identification, a service identifier, etc. In some embodiments, the size of the discovery payload may range from 48 bits or less to up to 100 bits or more. In some embodiments, for non-public safety service, the discovery payload 304/324 may include a ProSe application code, a ProSe function ID and a public land mobile network (PLMN) ID. For public safety service, the discovery payload 304/324 may include source/destination ID, a message type, a ProSe application ID, etc. In some embodiments, the destination ID may identify a single UE or a group of UEs that are the intended recipients of the discovery packet. In some embodiments, a UE mode of operation may be indicated which may define whether a public safety ProSe UE is acting as a UE-to-network relay, a UE-to-UE relay or both, or not acting as a relay.

Figure 4:
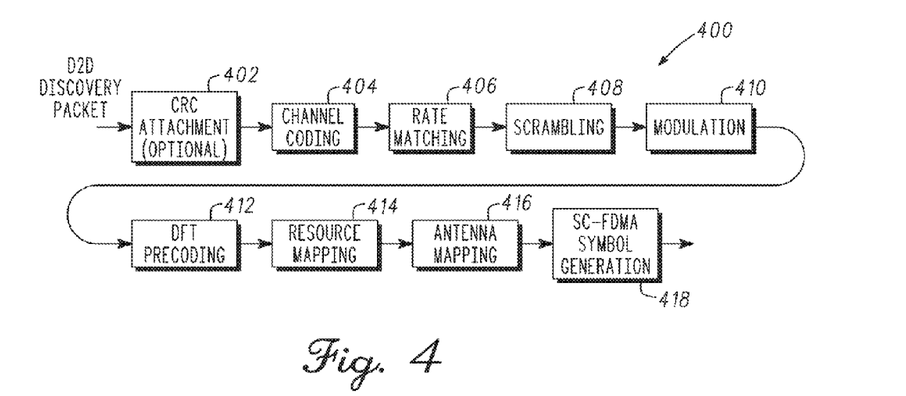
FIG. 4 illustrates D2D discovery packet processing in accordance with some embodiments.

FIG. 4 illustrates D2D discovery packet processing 400 in accordance with some embodiments. The elements illustrated in FIG. 4 may be performed by a physical layer, such as the physical layer (PHY) circuitry of a UE, such as UE 112 (FIG. 1).

The physical layer processing 400 may include attaching a CRC to the discovery packet at CRC attachment 402. The CRC attachment may be either processed in the physical layer or in the MAC layer. The CRC attachment may be optional. In addition, 8, 16 or 24 parity check bits may be used for packet-based D2D discovery design.

The physical layer processing 400 may include channel coding 404. Different from the Turbo coding scheme adopted for PUSCH, tail-biting convolutional coding (TBCC) used in PDCCH may be performed for packet-based D2D discovery and may provide improved performance and reduced decoding complexity. Furthermore, TBCC coding scheme may outperform Turbo coding for a packet with relatively small payload size, such as a discovery packet. For example, TBCC may achieve better link level discovery performance than Turbo coding when the payload size is 48 bits. When the payload size is 176 bits, Turbo coding may slightly outperform the TBCC, depending on various factors. Additionally, QPSK may provide considerable performance gain compared to 16QAM for both payload sizes.

The physical layer processing 400 may include rate matching 406. After the channel coding, coded bits may be rate-matched to fill into the amount of resources available for the D2D discovery transmission. That the amount of resource blocks for packet-based D2D discovery may be one or more PRB pairs, depending on the payload size and overall discovery performance requirement. In addition, the PRB size may be limited to the products of the integers 2, 3, and 5 as specified for PUSCH transmission of SC-OFDM waveform to reduce the implementation cost, although the scope of the embodiments is not limited in this respect.

The physical layer processing 400 may include scrambling 408. In order to help randomize the interference, bit scrambling may be applied after rate-matching. The scrambling identity for the initialization of scrambling sequence may be available at the discovering UE 112 to ensure proper and efficient decoding process. For both open and restricted discovery, a common scrambling identity may be used for all ProSe enabled devices within the network 100. This scrambling identity may be configured as a common D2D scrambling identity, although the scope of the embodiments is not limited in this respect. For example, for intra-cell discovery, this scrambling identity may be configured as the cell ID. For inter-cell or inter-PLMN discovery, the scrambling identity may be configured as a virtual scrambling identity, which may be predefined or broadcast by an eNB 104.

When the scrambling identity is configured as cell ID, the scrambling sequence generator may be initialized with:

$$c_{init} = f(N_{ID}^{cell})$$

where $N_{ID}^{cell}$ is the cell ID. One straightforward way is to define the scrambling identity as $c_{init} = N_{ID}^{cell}$.

As mentioned above, the scrambling identity may be configured as common scrambling identity, $$c_{init} = f(N_{ID}^{D2D})$$

where $N_{ID}^{D2D}$ is the virtual scrambling identity. One way is to define the scrambling identity as $c_{init} = N_{ID}^{D2D}$.

In some alternate embodiments, the scrambling identity may be configured as a function of discovery resource index (i.e., time and frequency index within the discovery zone), the cyclic shift index used for DMRS sequence transmission or cell ID, a common D2D scrambling identity or any combination of the above parameters. In some embodiments, the scrambling identity may be defined as a function of the cyclic shift index and/or OCC index used for DMRS sequence transmission and cell ID or common scrambling identity as follows:

$$c_{init} = f(n_{CS}, N_{ID}^{cell})$$

where $n_{CS}$ is the DMRS sequence index, which may be a function of cyclic shift index and/or OCC index. For open discovery, a UE 102 may randomly select the cyclic shift index for DMRS sequence transmission. One approach is to define the scrambling identity as $$c_{init} = n_{CS} \cdot c_0 + N_{ID}^{cell}.$$

where $c_0$ is a constant. For instance, $c_0$ may be chosen as $2^{14}$ to save the computational complexity.

In some alternate embodiments, the scrambling identity may be defined as a function of discovery resource index, cyclic shift index used for DMRS sequence transmission and cell ID or common scrambling identity:

$$c_{init} = f(n_s, n_f, n_{CS}, N_{ID}^{cell}),$$

where $n_s$ is the subframe index within the discovery zone and $n_f$ is the PRB index within the discovery zone. One approach is to define the scrambling identity as:

$$c_{init} = n_s \cdot c_0 + n_f \cdot c_1 + n_{CS} \cdot c_2 + N_{ID}^{cell}.$$

where $c_0$, $c_1$ and $c_2$ are the constants. In some embodiments, $c_0$, $c_1$ and $c_2$ may be chosen as a power of two to save the computational complexity.

The physical layer processing 400 may include modulation 410. The modulation schemes supported for PUSCH transmission may include QPSK, 16QAM and 64QAM. For the discovery payload 304/324, different modulation schemes may be used, however, QPSK modulation scheme may be desirable for the discovery header 322, although the scope of the embodiments is not limited in this respect.

The physical layer processing 400 may include discrete Fourier transform (DFT) precoding 412. Similar to a PUSCH transmission, DFT precoding may be utilized for packet-based D2D discovery in order to reduce the peak-to-average power ratio (PAPR), which can improve the transmit power efficiency and may potentially increase the discovery range for ProSe-enabled devices.

The physical layer processing 400 may include resource mapping 414. The discovery resources for packet transmission may be either randomly selected from within the configured discovery zone 204 by a ProSe enable device in contention-based discovery or explicitly allocated by an eNB 104 in non-contention-based discovery. In some embodiments, a multi-cluster PUSCH transmission may be applied for packet-based D2D discovery to exploit the benefits of frequency diversity. The frequency gap between two clusters may be configured and addressed appropriately in order to reduce the co-channel interference in the discovery region.

The physical layer processing 400 may include antenna mapping 416. When a ProSe-enabled device is equipped with multiple transmit antennas, a multi-antenna transmission scheme may be employed to further improve the link level performance. A common precoder structure may be used for open D2D discovery to allow power-efficient discovery.

The physical layer processing 400 may include SC-FDMA symbol generation 418. SC-FDMA symbol generation procedure for PUSCH transmission may be reused for packet-based D2D discovery design, including cyclic-prefix (CP) insertion and a half-subcarrier shift.

As discussed above, the uplink PUSCH DMRS may primarily be used for channel estimation for coherent demodulation of the PUSCH. For packet-based D2D discovery, a similar DMRS sequence generation procedure based on Zadoff-Chu sequences may be adopted. A UE specific cyclic shift may be either randomly selected by ProSe-enabled devices in contention based discovery scenario or explicitly signaled by an eNB 104 in contention free discovery scenario. With respect to the DMRS base sequences, a common base sequence may be used by all ProSe-enabled devices, which may reduce the amount of blind detections at the discovery UEs significantly. Alternatively, the base sequence may be selected or chosen as a function of the cell on which an RRC_IDLE D2D device camps on or an RRC_CONNECTED D2D device is associated to (for within network coverage scenarios) and a function of the identity of the Peer Radio Head (PRH) or cluster head (for partial or outside network coverage scenarios). This may help improve the robustness of the channel estimation via interference averaging effects. Note that while sequence-group hopping may be disabled for discovery packet transmissions, cyclic shift hopping may be enabled if the base sequence not common and is a function of camping cell-ID, PRH-ID, etc. as described above. In some embodiments, ProSe-enabled UEs may randomly choose one of two OCCs for the PUSCH DMRS, although the scope of the embodiments is not limited in this respect.

In order to exploit the benefits of frequency diversity, frequency hopping may be adopted for packet-based D2D discovery. Similar to frequency hopping for PUSCH transmission, two options of hopping pattern design may be employed: type-1 D2D discovery hopping utilizes the explicit hopping pattern; while type 2 D2D discovery hopping uses the subband hopping and mirroring mechanism. In addition, the hopping procedure may follow either intra-subframe or inter-subframe based hopping mode. Selection between type-1 and type-2 discovery hopping, as well as intra-subframe and inter-subframe hopping may be provided by higher layer in a cell-specific manner.

Figure 5:
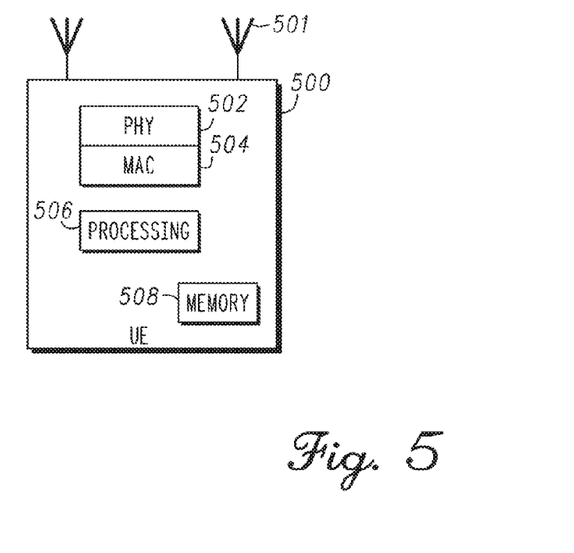
FIG. 5 illustrates a functional block diagram of a UE in accordance with some embodiments.

FIG. 5 illustrates a functional block diagram of a UE in accordance with some embodiments. The UE 500 may be suitable for use as any one or more of the UEs 102 illustrated in FIG. 1, including UE 112 and UE 114. The UE 500 may include physical layer (PHY) circuitry 502 for transmitting and receiving signals to and from eNBs 104 (FIG. 1) using one or more antennas 501 as well as for D2D communications with other UEs. UE 500 may also include medium access control layer (MAC) circuitry 504 for controlling access to the wireless medium. UE 500 may also include processing circuitry 506 and memory 508 arranged to configure the various elements of the UE 500 to perform the various operations described herein.

In accordance with some embodiments, the UE 500, while in either RRC idle or RRC connected mode, may be configured to transmit a discovery packet 101 (FIG. 1) to discover another UE as described herein and receive responses to the discovery packet 101 from the other UE. The UE 500 may also be configured to monitor and attempt to decode a received discovery packet that is transmitted in the discovery zone 204 (FIG. 2) by another UE for discovery by the other UE. The UE 500 may also be arranged to establish a D2D connection with another UE after either discovering the other UE or after being discovered by another UE. The channel resources for the D2D discovery and the D2D connection may be assigned by the eNB 104 as discussed herein.

In accordance with some embodiments, the UE 500 may be configured to receive signaling from an eNB 104 indicating resources of the discovery zone 204 allocated for D2D discovery and may configure a discovery packet 300/320 in accordance with a predetermined configuration to have at least a discovery payload 304/324 and a CRC 306/326. The discovery payload may be configured include discovery-related content. The UE 500 may also transmit the discovery packet 300/320 on at least some of the indicated discovery resources for receipt by a receiving UE.

In some embodiments, the UE 500 may a portable wireless communication device or a mobile device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas 501 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the UE 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 6:
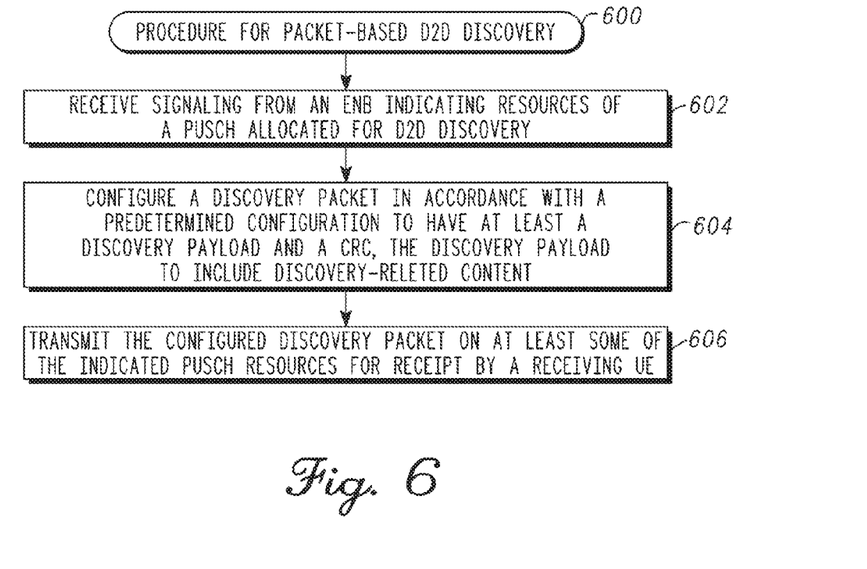
FIG. 6 is a procedure for packet-based D2D discovery in accordance with some embodiments.

FIG. 6 is a procedure for packet-based D2D discovery in accordance with some embodiments. Discovery procedure 600 may be performed by a ProSe enabled UE arranged for packet-based D2D discovery, such as UE 112 (FIG. 1).

Operation 602 may include receiving signaling from an eNB 104 indicating resources allocated for D2D discovery.

Operation 604 may include configuring a discovery packet 300/320 in accordance with a predetermined configuration to have at least a discovery payload 304/324 and a CRC. The discovery payload may include discovery-related content.

Operation 606 may include transmitting the configured discovery packet 300/320 on at least some of the indicated discovery resources (e.g., PRBs 206 of discovery zone 204) for receipt by a receiving, such as UE 114 (FIG. 1).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for proximity services (ProSe), the apparatus comprising: memory; and processing circuitry, configured to:
decode a system information block (SIB) from an enhanced node B (eNB), the SIB comprising discovery resource configuration information for direct UE-to-UE communications, the SIB including an indication of resources of a discovery resource pool for transmission and reception of discovery packets;
encode a discovery packet to include a discovery payload and a cyclic-redundancy check (CRC), the discovery packet having a predetermined size;
configure the encoded discovery packet for transmission within the resources of the discovery resource pool in accordance with a quadrature phase-shift keying (QPSK) modulation scheme;
generate a demodulation reference signal (DMRS) for transmission within the resources of the discovery resource pool, the DMRS mapped to a base sequence configured for demodulation of the discovery packet, wherein the DMRS is configured for demodulation of the discovery packet by another UE.

2. The apparatus of claim 1 wherein the processing circuitry is further configured to: initialize a scrambling sequence with a scrambling identity;
perform bit scrambling on coded bits of the discovery packet in accordance with the scrambling sequence.

3. The apparatus of claim 2, wherein for discovery packet transmissions, the sequence generator is initialized with a predetermined value at a start of each of a plurality of subframes.

4. The apparatus of claim 3, wherein the SIB indicates whether the resources of the discovery resource pool are commonly allocated for device-to-device communication, or individually allocated for UE-to-UE communication.

5. The apparatus of claim 4 wherein the discovery packet is configured to be transmitted without a header.

6. The apparatus of claim 5 wherein the resources of the discovery resource pool are scheduled periodically.

7. The apparatus of claim 1 further comprising transceiver circuitry configured to: receive the SIB from the eNB;
transmit the encoded discovery packet within the resources of the discovery resource pool in accordance with the QPSK modulation scheme; and
transmit the DMRS within the resources of the discovery resource pool.

8. The apparatus of claim 7 wherein the transceiver circuitry is further configured to transmit the encoded discovery packet in accordance with a single-carrier frequency-division multiple access (SC-FDMA) technique within indicated resources of the discovery resource pool, and
wherein the processing circuitry is configured to monitor some of the resources of the discovery resource pool for discovery announcements from other UEs.

9. The apparatus of claim 8 wherein the processing circuitry comprises a baseband processor.

10. A non-transitory computer-readable storage medium that stores instructions for execution by processing circuitry of a user equipment (UE) to configure the UE to:
decode a system information block (SIB) from an enhanced node B (eNB), the SIB comprising discovery resource configuration information for direct UE-to-UE communications, the SIB including an indication of resources of a discovery resource pool for transmission and reception of discovery packets;
encode a discovery packet to include a discovery payload and a cyclic-redundancy check (CRC), the discovery packet having a predetermined size;
configure the encoded discovery packet for transmission without a header within the resources of the discovery resource pool in accordance with a quadrature phase-shift keying (QPSK) modulation scheme; and
generate a demodulation reference signal (DMRS) for transmission within the resources of the discovery resource pool, the DMRS mapped to a base sequence configured for demodulation of the discovery packet, wherein the DMRS is configured for demodulation of the discovery packet by another UE.

11. The computer-readable storage medium of claim 10, wherein the SIB indicates whether the resources of the discovery resource pool are commonly allocated for device-to-device communication, or individually allocated for UE-to-UE communication.

12. The computer-readable storage medium of claim 11 wherein the resources of the discovery resource pool are scheduled periodically.

13. An apparatus of a user equipment (UE) configured for proximity services (ProSe), the apparatus comprising:
memory; and
processing circuitry, configured to:
decode a system information block (SIB) from an enhanced node B (eNB), the SIB comprising discovery resource configuration information for direct UE-to-UE communications, the SIB including an indication of resources of a discovery resource pool for transmission and reception of discovery packets;
decode an encoded discovery packet received within the resources of the discovery resource pool, the encoded discovery packet modulated in accordance with a quadrature phase-shift keying (QPSK) modulation scheme, the discovery packet including a discovery payload and a cyclic-redundancy check (CRC), the discovery packet having a predetermined size;
decode a demodulation reference signal (DMRS) received within the resources of the discovery resource pool, the DMRS mapped to a base sequence and configured for demodulation of the discovery packet;
wherein the encoded discovery packet is devoid of a header.

14. The apparatus of claim 13 wherein the encoded discovery packet and the DMRS are received from another UE.

15. The apparatus of claim 13, wherein the SIB indicates whether the resources of the discovery resource pool are commonly allocated for device-to-device communication, or individually allocated for UE-to-UE communication.

16. The apparatus of claim 15 wherein the resources of the discovery resource pool are scheduled periodically.

17. The apparatus of claim 16 wherein the processing circuitry is configured to configure the UE to monitor some of the resources of the discovery resource pool for discovery announcements from other UEs.

* * * * *

UNITED STATES PATENT AND TRADEMARK OFFICE
CERTIFICATE OF CORRECTION

PATENT NO. : 9,860,732 B2
APPLICATION NO. : 15/096504
DATED : January 2, 2018
INVENTOR(S) : Xiong et al.

It is certified that error appears in the above-identified patent and that said Letters Patent is hereby corrected as shown below:

On the Title Page

On page 6, in Column 1, item (56) under "Other Publications", Line 65, delete "(E-UTRS)" and insert --(E-UTRA)-- therefor On page 6, in Column 2, item (56) under "Other Publications", Line 1, delete "(E_UTRA);" and insert --(E-UTRA);-- therefor On page 6, in Column 2, item (56) under "Other Publications", Line 30, delete ""international" and insert --"International-- therefor On page 6, in Column 2, item (56) under "Other Publications", Line 70, delete "T/US2014/050209," and insert --PCT/US2014/050209,-- therefor On page 7, in Column 1, item (56) under "Other Publications", Line 21, delete "Mobil" and insert --Mobile-- therefor On page 7, in Column 1, item (56) under "Other Publications", Line 26, delete "Enhancemetns"," and insert --Enhancements",-- therefor On page 7, in Column 1, item (56) under "Other Publications", Line 55, delete "establising" and insert --establishing-- therefor On page 7, in Column 2, item (56) under "Other Publications", Line 23, delete ""Discussi on" and insert --"Discussion-- therefor On page 8, in Column 1, item (56) under "Other Publications", Line 25, delete "Resonse" and insert --Response-- therefor Signed and Sealed this
Fourth Day of June, 2019

Andrei Iancu
*Director of the United States Patent and Trademark Office*

In the Claims

In Column 15, Line 25, in Claim 1, after "comprising:", insert --¶--

In Column 15, Line 26, in Claim 1, after "and", insert --¶--

In Column 15, Line 64, in Claim 7, after "to:", insert --¶--